(12) United States Patent
Hwang et al.

(10) Patent No.: US 12,490,263 B2
(45) Date of Patent: Dec. 2, 2025

(54) METHOD AND DEVICE FOR TRANSMITTING/RECEIVING WIRELESS SIGNAL IN WIRELESS COMMUNICATION SYSTEM

(71) Applicant: LG ELECTRONICS INC., Seoul (KR)

(72) Inventors: Seunggye Hwang, Seoul (KR); Youngdae Lee, Seoul (KR); Jaehyung Kim, Seoul (KR); Joonkui Ahn, Seoul (KR); Hyunsoo Ko, Seoul (KR); Suckchel Yang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 280 days.

(21) Appl. No.: 18/266,123

(22) PCT Filed: Jan. 17, 2022

(86) PCT No.: PCT/KR2022/000791
§ 371 (c)(1),
(2) Date: Jun. 8, 2023

(87) PCT Pub. No.: WO2022/154606
PCT Pub. Date: Jul. 21, 2022

(65) Prior Publication Data
US 2024/0107533 A1    Mar. 28, 2024

(30) Foreign Application Priority Data

Jan. 15, 2021 (KR) .................. 10-2021-0006193
Jan. 18, 2021 (KR) .................. 10-2021-0006492

(51) Int. Cl.
*H04W 72/0446* (2023.01)
*H04L 1/00* (2006.01)
(Continued)

(52) U.S. Cl.
CPC ....... *H04W 72/1273* (2013.01); *H04L 1/0061* (2013.01); *H04W 68/02* (2013.01); *H04W 72/0446* (2013.01); *H04W 72/232* (2023.01)

(58) Field of Classification Search
None
See application file for complete search history.

(56) References Cited

U.S. PATENT DOCUMENTS

2022/0124672 A1* 4/2022 Xu ................ H04W 72/044
2022/0225237 A1* 7/2022 He ................ H04W 68/005
(Continued)

FOREIGN PATENT DOCUMENTS

WO      2020225048       11/2020
WO   WO-2022134117 A1 *  6/2022   ............ H04W 68/00

OTHER PUBLICATIONS

Moderator (MediaTek) "Summary for Potential Power Saving Enhancements," 3GPP TSG RAN WG1 e-Meeting #102, R1-2007063, Sep. 4, 2020.
(Continued)

*Primary Examiner* — Duc T Duong
(74) *Attorney, Agent, or Firm* — BRYAN CAVE LEIGHTON PAISNER LLP

(57) ABSTRACT

A terminal according to one embodiment of the present disclosure can receive a physical downlink control channel (PDCCH) on the basis of the detection of a paging early indication (PEI) and can receive a physical downlink shared channel (PDSCH) on the basis of the PDCCH, a slot in which the PDSCH is to be received can be determined on the basis of one from among a plurality of time domain resource allocation (TDRA) tables set in the terminal, and the value "N" of a TDRA field included in DCI, and the plurality of TDRA tables can include a first TDRA table including at least one entry for same-slot scheduling of the PDCCH and
(Continued)

the PDSCH, and a second TDRA table including only entries for cross-slot scheduling of the PDCCH and the PDSCH.

14 Claims, 16 Drawing Sheets

(51) Int. Cl.
*H04W 68/02* (2009.01)
*H04W 72/1273* (2023.01)
*H04W 72/232* (2023.01)

(56) References Cited

U.S. PATENT DOCUMENTS

| | | | | |
|---|---|---|---|---|
| 2023/0108646 A1* | 4/2023 | Tseng | ................. | H04W 68/025 455/458 |
| 2023/0146553 A1* | 5/2023 | Liao | ..................... | H04W 68/02 370/329 |
| 2023/0209464 A1* | 6/2023 | Tsai | ................. | H04W 52/0216 370/311 |
| 2023/0309060 A1* | 9/2023 | Xu | ..................... | H04W 52/0216 |
| 2023/0328690 A1* | 10/2023 | Xu | ...................... | H04W 72/232 370/329 |
| 2023/0362889 A1* | 11/2023 | Xu | .................... | H04W 52/0219 |
| 2023/0397115 A1* | 12/2023 | Maleki | .............. | H04W 52/0235 |
| 2024/0015650 A1* | 1/2024 | Ren | .................... | H04W 52/0216 |
| 2024/0064699 A1* | 2/2024 | Fu | ........................ | H04W 68/00 |

OTHER PUBLICATIONS

CATT, "Offline Discussion on UE Power Saving Schemes," 3GPP TSG RAN WG1 Meeting #95, R1-1814093, Nov. 15, 2018.

Intel Corporation, "On PDCCH enhancements for URLLC," 3GPP TSG RAN WG1 #99, R1-1912214, Nov. 9, 2019.

Nokia, Nokia Shanghai Bell, "Correction to PDSCH TDRA for DCI 1-2," 3GPP TSG-RAN WG2 Meeting #112 Electronic, R2-2009169, Oct. 10, 2023.

* cited by examiner

METHOD AND DEVICE FOR TRANSMITTING/RECEIVING WIRELESS SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2022/000791 filed Jan. 17, 2022, which claims benefit of Korean Patent Application Nos. 10-2021-0006193 filed Jan. 15, 2021 and 10-2021-0006492 filed Jan. 18, 2021, which is hereby incorporated by reference herein in their entirety.

TECHNICAL FIELD

The present disclosure relates to a wireless communication system, and more particularly, to a method and apparatus for transmitting and receiving a wireless signal.

BACKGROUND ART

Generally, a wireless communication system is developing to diversely cover a wide range to provide such a communication service as an audio communication service, a data communication service and the like. The wireless communication is a sort of a multiple access system capable of supporting communications with multiple users by sharing available system resources (e.g., bandwidth, transmit power, etc.). For example, the multiple access system may be any of a code division multiple access (CDMA) system, a frequency division multiple access (FDMA) system, a time division multiple access (TDMA) system, an orthogonal frequency division multiple access (OFDMA) system, and a single carrier frequency division multiple access (SC-FDMA) system.

DISCLOSURE

Technical Problem

An object of the present disclosure is to provide a method of efficiently performing wireless signal transmission/reception procedures and an apparatus therefor.

It will be appreciated by persons skilled in the art that the objects that could be achieved with the present disclosure are not limited to what has been particularly described hereinabove and the above and other objects that the present disclosure could achieve will be more clearly understood from the following detailed description.

Technical Solution

According to an aspect of the present disclosure, a method of receiving a signal by a user equipment (UE) in a wireless communication system includes monitoring a paging early indication (PEI), monitoring a physical downlink control channel (PDCCH) on a paging occasion (PO) related to the PEI based on detection of the PEI, and receiving a physical downlink shared channel (PDSCH) based on downlink control information (DCI) carried by the PDCCH. A slot in which the PDSCH is to be received may be determined based on one of a plurality of time domain resource allocation (TDRA) tables configured in the UE and a value 'N' of a TDRA field included in the DCI. The plurality of TDRA tables may include a first TDRA table including at least one entry for same-slot scheduling of the PDCCH and the PDSCH and a second TDRA table including only entries for cross slot scheduling of the PDCCH and the PDSCH.

Whether the value 'N' of the TDRA field indicates an entry 'N' of the first TDRA table or an entry 'N' of the second TDRA table may be determined based on the PEI.

The UE may determine one TDRA table related to the value 'N' of the TDRA field among the plurality of TDRA tables based on whether the PEI is related to a first radio network temporary identifier (RNTI) or a second RNTI.

The first RNTI may be configured irrespective of UE capability for detecting the PEI and the second RNTI may be configured based on that the UE has the UE capability for detecting the PEI.

The UE may determine that the value 'N' of the TDRA field indicates the entry 'N' of the first TDRA table based on that the first RNTI is used in cyclic redundancy check (CRC) scrambling, or may determine that the value 'N' of the TDRA field indicates the entry 'N' of the second TDRA table based on that the second RNTI is used in the CRC scrambling.

The CRC scrambling may include at least one of CRC scrambling of the PEI and CRC scrambling of the PDCCH.

The UE may determine whether the PDSCH scheduled by the DCI needs to be scheduled only after a slot in which the DCI is received before decoding of the DCI carried by the PDCCH is completed, based on the detection of the PEI.

The UE may assume that the PDSCH is not scheduled on the same slot as the PDCCH in a state in which the second TDRA is selected based on the PEI.

At least one of the PDCCH and the PDSCH may be scrambled based on a radio network temporary identifier (RNTI) indicated through the PEI.

Each entry of each TDRA table may indicate a combination of {slot offset, start symbol, and length} for a corresponding PDSCH time resource.

Another aspect of the present disclosure may provide a processor-readable recording medium having recorded thereon a program for executing the aforementioned signal reception method.

Another aspect of the present disclosure may provide a UE for performing the aforementioned signal reception method.

Another aspect of the present disclosure may provide a device for controlling a UE for performing the aforementioned signal reception method.

According to another embodiment of the present disclosure, a method of transmitting a signal by a base station (BS) in a wireless communication system includes transmitting a paging early indication (PEI), transmitting a physical downlink control channel (PDCCH) on a paging occasion (PO) related to the PEI after the transmitting the PEI, and transmitting a physical downlink shared channel (PDSCH) based on downlink control information (DCI) carried by the PDCCH. A slot in which the PDSCH is to be transmitted may be indicated based on one of a plurality of time domain resource allocation (TDRA) tables and a value 'N' of a TDRA field included in the DCI. The plurality of TDRA tables may include a first TDRA table including at least one entry for same-slot scheduling of the PDCCH and the PDSCH and a second TDRA table including only entries for cross slot scheduling of the PDCCH and the PDSCH. Whether the value 'N' of the TDRA field indicates an entry 'N' of the first TDRA table or an entry 'N' of the second TDRA table may be determined based on the PEI.

Another aspect of the present disclosure may provide a Bs for performing the aforementioned signal reception method.

Advantageous Effects

According to an embodiment of the present disclosure, a user equipment (UE) for supporting a resulting paging early indication (PEI) may pre-determine whether cross slot scheduling of a data signal scheduled by a corresponding control signal is ensured even before decoding a control signal, through the PEI, thereby minimizing power consumption and processing burden that are required when the UE needs to always be prepared.

The effects obtainable in the present disclosure are not limited to the effects mentioned above, and other effects not mentioned are clearly understood by one of ordinary skill in the art from the description above.

DESCRIPTION OF DRAWINGS

FIG. 23 illustrates an exemplary discontinuous reception (DRX) operation applicable to the present disclosure.

MODE FOR DISCLOSURE

Figure 1:
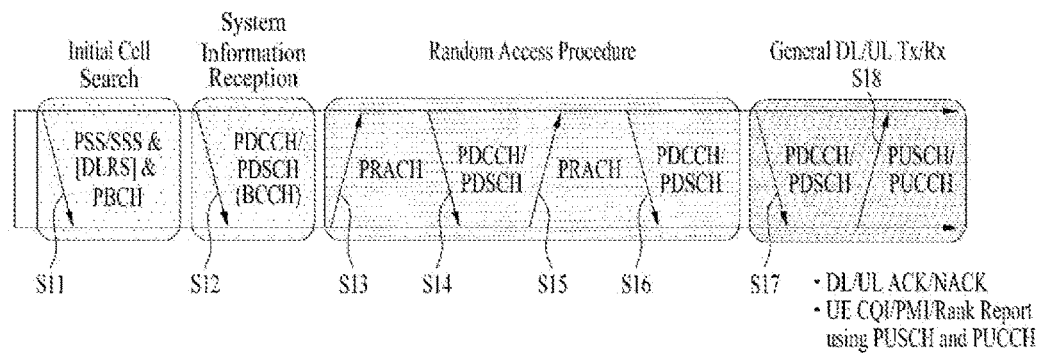
FIG. 1 illustrates physical channels used in a 3rd generation partnership project (3GPP) system as an exemplary wireless communication system, and a general signal transmission method using the same.

Embodiments of the present disclosure are applicable to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA can be implemented as a radio technology such as Universal Terrestrial Radio Access (UTRA) or CDMA2000. TDMA can be implemented as a radio technology such as Global System for Mobile communications (GSM)/General Packet Radio Service (GPRS)/Enhanced Data Rates for GSM Evolution (EDGE). OFDMA can be implemented as a radio technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, and Evolved UTRA (E-UTRA). UTRA is a part of Universal Mobile Telecommunications System (UMTS). 3rd Generation Partnership Project (3GPP) Long Term Evolution (LTE) is part of Evolved UMTS (E-UMTS) using E-UTRA, and LTE-Advanced (A) is an evolved version of 3GPP LTE. 3GPP NR (New Radio or New Radio Access Technology) is an evolved version of 3GPP LTE/LTE-A.

As more and more communication devices require a larger communication capacity, there is a need for mobile broadband communication enhanced over conventional radio access technology (RAT). In addition, massive Machine Type Communications (MTC) capable of providing a variety of services anywhere and anytime by connecting multiple devices and objects is another important issue to be considered for next generation communications. Communication system design considering services/UEs sensitive to reliability and latency is also under discussion. As such, introduction of new radio access technology considering enhanced mobile broadband communication (eMBB), massive MTC, and Ultra-Reliable and Low Latency Communication (URLLC) is being discussed. In an embodiment of the present disclosure, for simplicity, this technology will be referred to as NR (New Radio or New RAT).

For the sake of clarity, 3GPP NR is mainly described, but the technical idea of the present disclosure is not limited thereto.

For the background art relevant to the present disclosure, the definitions of terms, and abbreviations, the following documents may be incorporated by reference.

3GPP LTE

TS 36.211: Physical channels and modulation
TS 36.212: Multiplexing and channel coding
TS 36.213: Physical layer procedures
TS 36.300: Overall description
TS 36.321: Medium Access Control (MAC)
TS 36.331: Radio Resource Control (RRC)

3GPP NR

TS 38.211: Physical channels and modulation
TS 38.212: Multiplexing and channel coding
TS 38.213: Physical layer procedures for control
TS 38.214: Physical layer procedures for data
TS 38.300: NR and NG-RAN Overall Description
TS 38.321: Medium Access Control (MAC)
TS 38.331: Radio Resource Control (RRC) protocol specification
TS 37.213: Introduction of channel access procedures to unlicensed spectrum for NR-based access

Terms and Abbreviations

PSS: Primary Synchronization Signal
SSS: Secondary Synchronization Signal

CRS: Cell reference signal
CSI-RS Channel State Information Reference Signal
TRS: Tracking Reference Signal
SS: Search Space
CSS: Common Search Space
USS: UE-specific Search Space
PDCCH: Physical Downlink Control Channel; The PDCCH is used to represent PDCCHs of various structures which may be used for the same purpose in the following description.
PO: Paging Occasion
MO: Monitoring Occasion
BD: Blind Decoding
DCI: Downlink Control Information
WUS: Wake Up Signal; The WUS may be used to represent other method signals or channels (e.g., a paging early indication (PEI)), which perform a similar function.

In a wireless communication system, a user equipment (UE) receives information through downlink (DL) from a base station (BS) and transmit information to the BS through uplink (UL). The information transmitted and received by the BS and the UE includes data and various control information and includes various physical channels according to type/usage of the information transmitted and received by the UE and the BS.

FIG. 1 illustrates physical channels used in a 3GPP NR system and a general signal transmission method using the same.

When a UE is powered on again from a power-off state or enters a new cell, the UE performs an initial cell search procedure, such as establishment of synchronization with a BS, in step S101. To this end, the UE receives a synchronization signal block (SSB) from the BS. The SSB includes a primary synchronization signal (PSS), a secondary synchronization signal (SSS), and a physical broadcast channel (PBCH). The UE establishes synchronization with the BS based on the PSS/SSS and acquires information such as a cell identity (ID). The UE may acquire broadcast information in a cell based on the PBCH. The UE may receive a DL reference signal (RS) in an initial cell search procedure to monitor a DL channel status.

After initial cell search, the UE may acquire more specific system information by receiving a physical downlink control channel (PDCCH) and receiving a physical downlink shared channel (PDSCH) based on information of the PDCCH in step S102.

The UE may perform a random access procedure to access the BS in steps S103 to S106. For random access, the UE may transmit a preamble to the BS on a physical random access channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a physical uplink shared channel (PUSCH)/physical uplink control channel (PUCCH) (S108), as a general downlink/uplink signal transmission procedure. Control information transmitted from the UE to the BS is referred to as uplink control information (UCI). The UCI includes hybrid automatic repeat and request acknowledgement/negative-acknowledgement (HARQ-ACK/NACK), scheduling request (SR), channel state information (CSI), etc. The CSI includes a channel quality indicator (CQI), a precoding matrix indicator (PMI), a rank indicator (RI), etc. While the UCI is transmitted on a PUCCH in general, the UCI may be transmitted on a PUSCH when control information and traffic data need to be simultaneously transmitted. In addition, the UCI may be aperiodically transmitted through a PUSCH according to request/command of a network.

Figure 2:
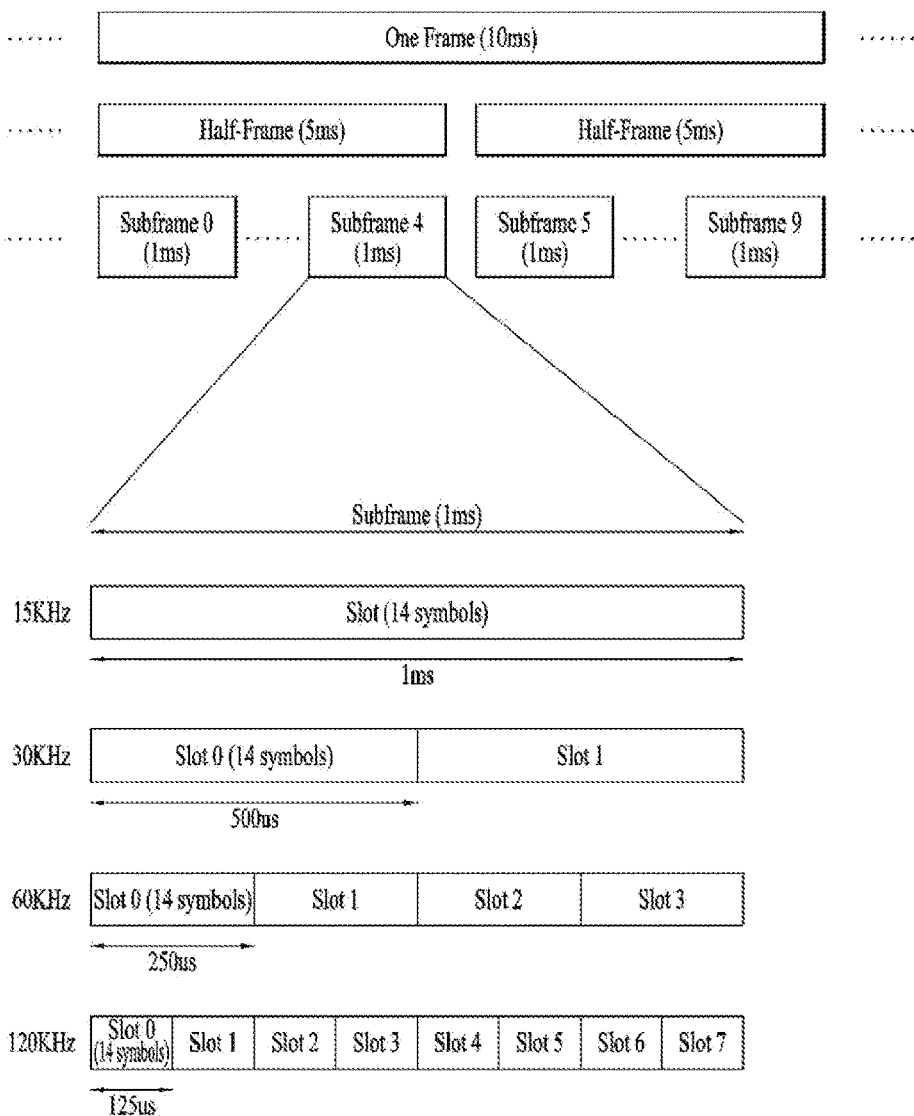
FIG. 2 illustrates a radio frame structure.

FIG. 2 illustrates a radio frame structure. In NR, uplink and downlink transmissions are configured with frames. Each radio frame has a length of 10 ms and is divided into two 5-ms half-frames (HF). Each half-frame is divided into five 1-ms subframes (SFs). A subframe is divided into one or more slots, and the number of slots in a subframe depends on subcarrier spacing (SCS). Each slot includes 12 or 14 Orthogonal Frequency Division Multiplexing (OFDM) symbols according to a cyclic prefix (CP). When a normal CP is used, each slot includes 14 OFDM symbols. When an extended CP is used, each slot includes 12 OFDM symbols.

Table 1 exemplarily shows that the number of symbols per slot, the number of slots per frame, and the number of slots per subframe vary according to the SCS when the normal CP is used.

TABLE 1

| SCS ($15*2^u$) | $N^{slot}_{symb}$ | $N^{frame, u}_{slot}$ | $N^{subframe, u}_{slot}$ |
|---|---|---|---|
| 15 KHz (u = 0) | 14 | 10 | 1 |
| 30 KHz (u = 1) | 14 | 20 | 2 |
| 60 KHz (u = 2) | 14 | 40 | 4 |
| 120 KHz (u = 3) | 14 | 80 | 8 |
| 240 KHz (u = 4) | 14 | 160 | 16 |

$N^{slot}_{symb}$: Number of symbols in a slot
$N^{frame, u}_{slot}$: Number of slots in a frame
$N^{subframe, u}_{slot}$: Number of slots in a subframe Table 2 illustrates that the number of symbols per slot, the number of slots per frame, and the number of slots per subframe vary according to the SCS when the extended CP is used.

TABLE 2

| SCS ($15*2^u$) | $N^{slot}_{symb}$ | $N^{frame, u}_{slot}$ | $N^{subframe, u}_{slot}$ |
|---|---|---|---|
| 60 KHz (u = 2) | 12 | 40 | 4 |

The structure of the frame is merely an example. The number of subframes, the number of slots, and the number of symbols in a frame may vary.

In the NR system, OFDM numerology (e.g., SCS) may be configured differently for a plurality of cells aggregated for one UE. Accordingly, the (absolute time) duration of a time resource (e.g., an SF, a slot or a TTI) (for simplicity, referred to as a time unit (TU)) consisting of the same number of symbols may be configured differently among the aggregated cells. Here, the symbols may include an OFDM symbol (or a CP-OFDM symbol) and an SC-FDMA symbol (or a discrete Fourier transform-spread-OFDM (DFT-s-OFDM) symbol).

Figure 3:
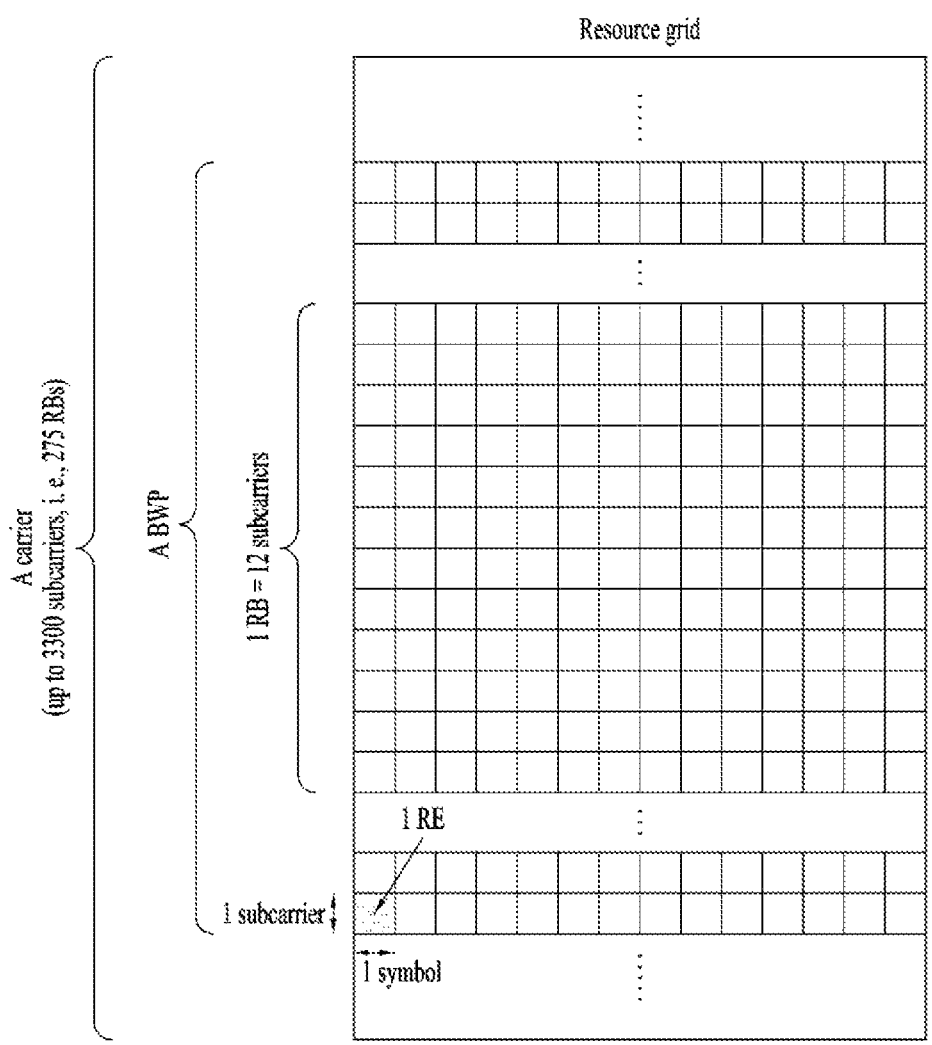
FIG. 3 illustrates a resource grid of a slot.

FIG. 3 illustrates a resource grid of a slot. A slot includes a plurality of symbols in the time domain. For example, when the normal CP is used, the slot includes 14 symbols. However, when the extended CP is used, the slot includes 12 symbols. A carrier includes a plurality of subcarriers in the frequency domain. A resource block (RB) is defined as a plurality of consecutive subcarriers (e.g., 12 consecutive subcarriers) in the frequency domain A bandwidth part (BWP) may be defined to be a plurality of consecutive physical RBs (PRBs) in the frequency domain and correspond to a single numerology (e.g., SCS, CP length, etc.). The carrier may include up to N (e.g., 5) BWPs. Data communication may be performed through an activated BWP, and only one BWP may be activated for one UE. In the resource grid, each element is referred to as a resource element (RE), and one complex symbol may be mapped to each RE.

Figure 4:
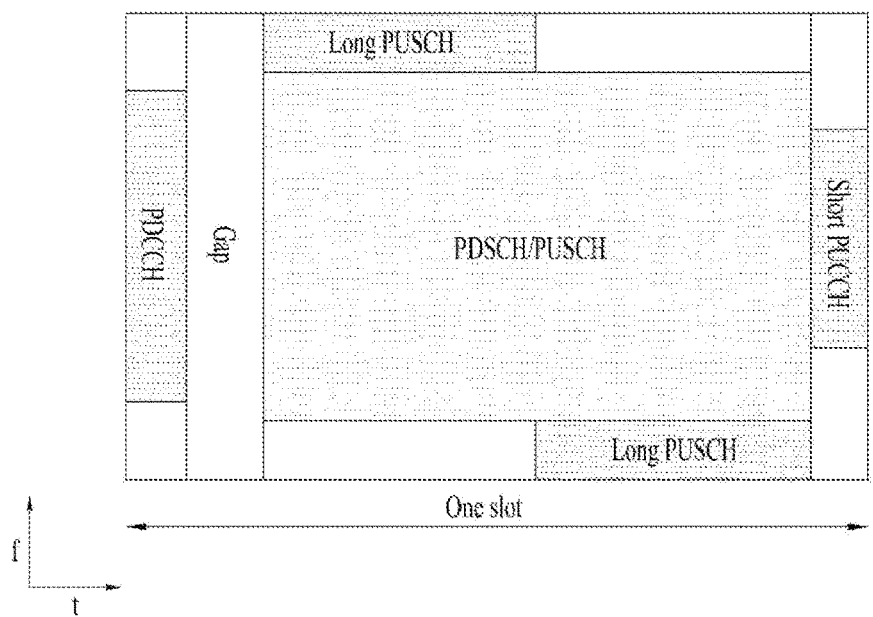
FIG. 4 illustrates exemplary mapping of physical channels in a slot.

FIG. 4 illustrates an example of mapping physical channels in a slot. In an NR system, a frame is characterized by a self-contained structure in which all of a DL control channel, DL or UL data, and a UL channel may be included in one slot. For example, the first N symbols of a slot may be used to carry a DL channel (e.g., PDCCH) (hereinafter, referred to as a DL control region), and the last M symbols of the slot may be used to carry a UL channel (e.g., PUCCH) (hereinafter, referred to as a UL control region). Each of N and M is an integer equal to or larger than 0. A resource area (hereinafter, referred to as a data region) between the DL control region and the UL control region may be used to transmit DL data (e.g., PDSCH) or UL data (e.g., PUSCH). A guard period (GP) provides a time gap for switching from a transmission mode to a reception mode or from the reception mode to the transmission mode. Some symbols at a DL-to-UL switching time in a subframe may be configured as a GP.

The PDCCH delivers DCI. For example, the PDCCH (i.e., DCI) may carry information about a transport format and resource allocation of a DL shared channel (DL-SCH), resource allocation information of an uplink shared channel (UL-SCH), paging information on a paging channel (PCH), system information on the DL-SCH, information on resource allocation of a higher-layer control message such as an RAR transmitted on a PDSCH, a transmit power control command, information about activation/release of configured scheduling, and so on. The DCI includes a cyclic redundancy check (CRC). The CRC is masked with various identifiers (IDs) (e.g. a radio network temporary identifier (RNTI)) according to an owner or usage of the PDCCH. For example, if the PDCCH is for a specific UE, the CRC is masked by a UE ID (e.g., cell-RNTI (C-RNTI)). If the PDCCH is for a paging message, the CRC is masked by a paging-RNTI (P-RNTI). If the PDCCH is for system information (e.g., a system information block (SIB)), the CRC is masked by a system information RNTI (SI-RNTI). When the PDCCH is for an RAR, the CRC is masked by a random access-RNTI (RA-RNTI).

Figure 5:
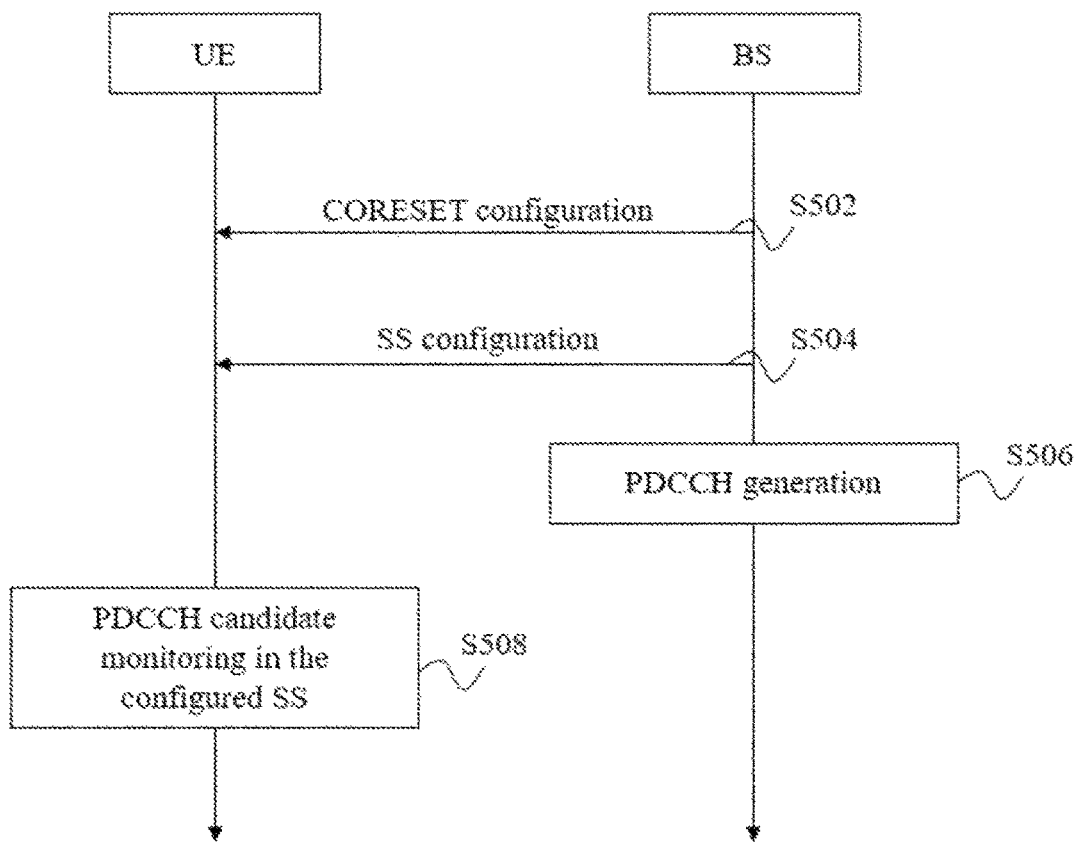
FIG. 5 illustrates an exemplary physical downlink control channel (PDCCH) transmission and reception process.

FIG. 5 illustrates an exemplary PDCCH transmission/reception process.

Referring to FIG. 5, a BS may transmit a control resource set (CORESET) configuration to a UE (S502). A CORESET is defined as a resource element group (REG) set having a given numerology (e.g., a subcarrier spacing (SCS), a cyclic prefix (CP) length, and so on). An REG is defined as one OFDM symbol by one (physical) resource block (P)RB. A plurality of CORESETs for one UE may overlap with each other in the time/frequency domain. A CORESET may be configured by system information (e.g., a master information block (MIB)) or higher-layer signaling (e.g., radio resource control (RRC) signaling). For example, configuration information about a specific common CORESET (e.g., CORESET #0) may be transmitted in the MIB. For example, a PDSCH carrying system information block 1 (SIB1) may be scheduled by a specific PDCCH, and CORESET #0 may be used to transmit the specific PDCCH. Further, configuration information about CORESET #N (e.g., N>0) may be transmitted by RRC signaling (e.g., cell-common RRC signaling, UE-specific RRC signaling, or the like). For example, the UE-specific RRC signaling carrying CORESET configuration information may include, but not limited to, various types of signaling such as an RRC setup message, an RRC reconfiguration message, and/or BWP configuration information. Specifically, a CORESET configuration may include the following information/fields.

controlResourceSetId: Indicates the ID of a CORESET.

frequencyDomainResources: Indicates the frequency-domain resources of the CORESET. The resources are indicated by a bitmap in which each bit corresponds to an RB group (=6 (consecutive) RBs). For example, the most significant bit (MSB) of the bitmap corresponds to a first RB group in a BWP. An RB group corresponding to a bit having a bit value of 1 is allocated as frequency-domain resources of the CORESET.

duration: Indicates the time-domain resources of the CORESET. It indicates the number of consecutive OFDM symbols included in the CORESET. The duration has a value between 1 and 3.

cce-REG-MappingType: Indicates a control channel element (CCE)-to-REG mapping type. An interleaved type and a non-interleaved type are supported.

interleaverSize: Indicates an interleaver size.

pdcch-DMRS-ScramblingID: Indicates a value used for PDCCH DMRS initialization. When pdcch-DMRS-ScramblingID is not included, the physical cell ID of a serving cell is used.

precoderGranularity: Indicates a precoder granularity in the frequency domain.

reg-BundleSize: Indicates an REG bundle size.

tci-PresentInDCI: Indicates whether a transmission configuration index (TCI) field is included in DL-related DCI.

tci-StatesPDCCH-ToAddList: Indicates a subset of TCI states configured in pdcch-Config, used for providing quasi-co-location (QCL) relationships between DL RS(s) in an RS set (TCI-State) and PDCCH DMRS ports.

Further, the BS may transmit a PDCCH search space (SS) configuration to the UE (S504). The PDCCH SS configuration may be transmitted by higher-layer signaling (e.g., RRC signaling). For example, the RRC signaling may include, but not limited to, various types of signaling such as an RRC setup message, an RRC reconfiguration message, and/or BWP configuration information. While a CORESET configuration and a PDCCH SS configuration are shown as separately signaled in FIG. 5, for convenience of description, the present disclosure is not limited thereto. For example, the CORESET configuration and the PDCCH SS configuration may be transmitted in one message (e.g., by one RRC signaling) or separately in different messages.

The PDCCH SS configuration may include information about the configuration of a PDCCH SS set. The PDCCH SS set may be defined as a set of PDCCH candidates monitored (e.g., blind-detected) by the UE. One or more SS sets may be configured for the UE. Each SS set may be a UE-specific search space (USS) set or a common search space (CSS) set. For convenience, PDCCH SS set may be referred to as "SS" or "PDCCH SS".

A PDCCH SS set includes PDCCH candidates. A PDCCH candidate is CCE(s) that the UE monitors to receive/detect a PDCCH. The monitoring includes blind decoding (BD) of PDCCH candidates. One PDCCH (candidate) includes 1, 2, 4, 8, or 16 CCEs according to an aggregation level (AL). One CCE includes 6 REGs. Each CORESET configuration is associated with one or more SSs, and each SS is associated with one CORESET configuration. One SS is defined based on one SS configuration, and the SS configuration may include the following information/fields.

searchSpaceId: Indicates the ID of an SS.

controlResourceSetId: Indicates a CORESET associated with the SS.

monitoringSlotPeriodicityAndOffset: Indicates a periodicity (in slots) and offset (in slots) for PDCCH monitoring.

monitoringSymbolsWithinSlot: Indicates the first OFDM symbol(s) for PDCCH monitoring in a slot configured with PDCCH monitoring. The first OFDM symbol(s) for PDCCH monitoring is indicated by a bitmap with each bit corresponding to an OFDM symbol in the slot. The MSB of the bitmap corresponds to the first OFDM symbol of the slot. OFDM symbol(s) corresponding to bit(s) set to 1 corresponds to the first symbol(s) of a CORESET in the slot.

nrofCandidates: Indicates the number of PDCCH candidates (one of values 0, 1, 2, 3, 4, 5, 6, and 8) for each AL where AL={1, 2, 4, 8, 16}.

searchSpaceType: Indicates CSS or USS as well as a DCI format used in the corresponding SS type.

Subsequently, the BS may generate a PDCCH and transmit the PDCCH to the UE (S506), and the UE may monitor PDCCH candidates in one or more SSs to receive/detect the PDCCH (S508). An occasion (e.g., time/frequency resources) in which the UE is to monitor PDCCH candidates is defined as a PDCCH (monitoring) occasion. One or more PDCCH (monitoring) occasions may be configured in a slot.

Table 3 shows the characteristics of each SS.

TABLE 3

| Type | Search Space | RNTI | Use Case |
|---|---|---|---|
| Type0-PDCCH | Common | SI-RNTI on a primary cell | SIB Decoding |
| Type0A-PDCCH | Common | SI-RNTI on a primary cell | SIB Decoding |
| Type1-PDCCH | Common | RA-RNTI or TC-RNTI on a primary cell | Msg2, Msg4 decoding in RACH |
| Type2-PDCCH | Common | P-RNTI on a primary cell | Paging Decoding |
| Type3-PDCCH | Common | INT-RNTI, SFI-RNTI, TPC-PUSCH-RNTI, TPC-PUCCH-RNTI, TPC-SRS-RNTI, C-RNTI, MCS-C-RNTI, or CS-RNTI(s) | |
| | UE Specific | C-RNTI, or MCS-C-RNTI, or CS-RNTI(s) | User specific PDSCH decoding |

Table 4 shows DCI formats transmitted on the PDCCH.

TABLE 4

| DCI format | Usage |
|---|---|
| 0_0 | Scheduling of PUSCH in one cell |
| 0_1 | Scheduling of PUSCH in one cell |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

DCI format 0_0 may be used to schedule a TB-based (or TB-level) PUSCH, and DCI format 0_1 may be used to schedule a TB-based (or TB-level) PUSCH or a code block group (CBG)-based (or CBG-level) PUSCH. DCI format 1_0 may be used to schedule a TB-based (or TB-level) PDSCH, and DCI format 1_1 may be used to schedule a TB-based (or TB-level) PDSCH or a CBG-based (or CBG-level) PDSCH (DL grant DCI). DCI format 0_0/0_1 may be referred to as UL grant DCI or UL scheduling information, and DCI format 1_0/1_1 may be referred to as DL grant DCI or DL scheduling information. DCI format 2_0 is used to deliver dynamic slot format information (e.g., a dynamic slot format indicator (SFI)) to a UE, and DCI format 2_1 is used to deliver DL pre-emption information to a UE. DCI format 2_0 and/or DCI format 2_1 may be delivered to a corresponding group of UEs on a group common PDCCH which is a PDCCH directed to a group of UEs.

DCI format 0_0 and DCI format 1_0 may be referred to as fallback DCI formats, whereas DCI format 0_1 and DCI format 1_1 may be referred to as non-fallback DCI formats. In the fallback DCI formats, a DCI size/field configuration is maintained to be the same irrespective of a UE configuration. In contrast, the DCI size/field configuration varies depending on a UE configuration in the non-fallback DCI formats.

A CCE-to-REG mapping type is configured as one of an interleaved CCE-to-REG type and a non-interleaved CCE-to-REG type.

Non-interleaved CCE-to-REG mapping (or localized CCE-to-REG mapping) (FIG. 5): 6 REGs for a given CCE are grouped into one REG bundle, and all of the REGs for the given CCE are contiguous. One REG bundle corresponds to one CCE.

Interleaved CCE-to-REG mapping (or distributed CCE-to-REG mapping): 2, 3 or 6 REGs for a given CCE are grouped into one REG bundle, and the REG bundle is interleaved within a CORESET. In a CORESET including one or two OFDM symbols, an REG bundle includes 2 or 6 REGs, and in a CORESET including three OFDM symbols, an REG bundle includes 3 or 6 REGs. An REG bundle size is set on a CORESET basis.

Figure 6:
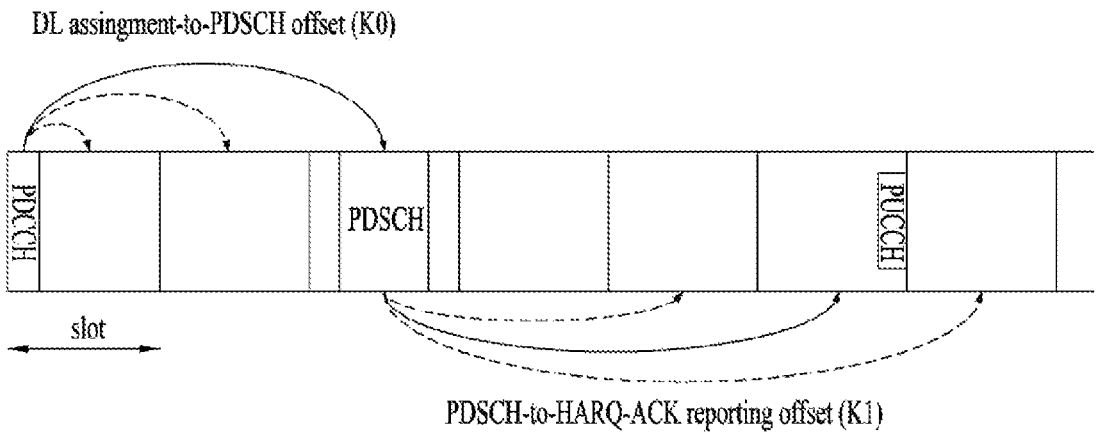
FIG. 6 illustrates an exemplary PDSCH reception and acknowledgment/negative acknowledgment (ACK/NACK) transmission process.

FIG. 6 illustrates an exemplary PDSCH reception and ACK/NACK transmission process. Referring to FIG. 6, the UE may detect a PDCCH in slot #n. The PDCCH includes DL scheduling information (e.g., DCI format 1_0 or DCI format 1_1). The PDCCH indicates a DL assignment-to-PDSCH offset, K0 and a PDSCH-to-HARQ-ACK reporting offset, K1. For example, DCI format 1_0 and DCI format 1_1 may include the following information.

Frequency domain resource assignment: Indicates an RB set assigned to a PDSCH.

Time domain resource assignment: Indicates K0 and the starting position (e.g. OFDM symbol index) and length (e.g. the number of OFDM symbols) of the PDSCH in a slot PDSCH-to-HARQ_feedback timing indicator: Indicates K1.

HARQ process number (4 bits): Indicates the HARQ process ID of data (e.g., a PDSCH or TB).

PUCCH resource indicator (PRI): Indicates a PUCCH resource to be used for UCI transmission among a plurality of PUCCH resources in a PUCCH resource set.

After receiving a PDSCH in slot #(n+K0) according to the scheduling information of slot #n, the UE may transmit UCI on a PUCCH in slot #(n+K1). The UCI may include an HARQ-ACK response to the PDSCH. FIG. 6 is based on the assumption that the SCS of the PDSCH is equal to the SCS of the PUCCH, and slot #n1=slot #(n+K0), for convenience, which should not be construed as limiting the present disclosure. When the SCSs are different, K1 may be indicated/interpreted based on the SCS of the PUCCH.

In the case where the PDSCH is configured to carry one TB at maximum, the HARQ-ACK response may be configured in one bit. In the case where the PDSCH is configured to carry up to two TBs, the HARQ-ACK response may be configured in 2 bits if spatial bundling is not configured and in 1 bit if spatial bundling is configured. When slot #(n+K1) is designated as an HARQ-ACK transmission timing for a plurality of PDSCHs, UCI transmitted in slot #(n+K1) includes HARQ-ACK responses to the plurality of PDSCHs.

Whether the UE should perform spatial bundling for an HARQ-ACK response may be configured for each cell group (e.g., by RRC/higher layer signaling). For example, spatial bundling may be configured for each individual HARQ-ACK response transmitted on the PUCCH and/or HARQ-ACK response transmitted on the PUSCH.

When up to two (or two or more) TBs (or codewords) may be received at one time (or schedulable by one DCI) in a corresponding serving cell (e.g., when a higher layer parameter maxNrofCodeWordsScheduledByDCI indicates 2 TBs), spatial bundling may be supported. More than four layers may be used for a 2-TB transmission, and up to four layers may be used for a 1-TB transmission. As a result, when spatial bundling is configured for a corresponding cell group, spatial bundling may be performed for a serving cell in which more than four layers may be scheduled among serving cells of the cell group. A UE which wants to transmit an HARQ-ACK response through spatial bundling may generate an HARQ-ACK response by performing a (bitwise) logical AND operation on A/N bits for a plurality of TBs.

For example, on the assumption that the UE receives DCI scheduling two TBs and receives two TBs on a PDSCH based on the DCI, a UE that performs spatial bundling may generate a single A/N bit by a logical AND operation between a first A/N bit for a first TB and a second A/N bit for a second TB. As a result, when both the first TB and the second TB are ACKs, the UE reports an ACK bit value to a BS, and when at least one of the TBs is a NACK, the UE reports a NACK bit value to the BS.

For example, when only one TB is actually scheduled in a serving cell configured for reception of two TBs, the UE may generate a single A/N bit by performing a logical AND operation on an A/N bit for the one TB and a bit value of 1. As a result, the UE reports the A/N bit for the one TB to the BS.

There are plurality of parallel DL HARQ processes for DL transmissions at the BS/UE. The plurality of parallel HARQ processes enable continuous DL transmissions, while the BS is waiting for an HARQ feedback indicating successful or failed reception of a previous DL transmission. Each HARQ process is associated with an HARQ buffer in the medium access control (MAC) layer. Each DL HARQ process manages state variables such as the number of MAC physical data unit (PDU) transmissions, an HARQ feedback for a MAC PDU in a buffer, and a current redundancy version. Each HARQ process is identified by an HARQ process ID.

Figure 7:
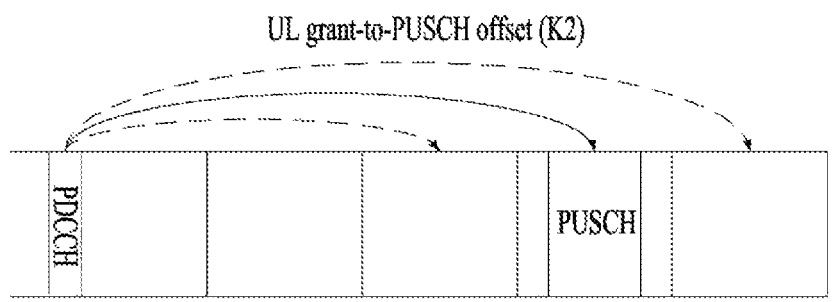
FIG. 7 illustrates an exemplary physical uplink shared channel (PUSCH) transmission process.

FIG. 7 illustrates an exemplary PUSCH transmission procedure. Referring to FIG. 7, the UE may detect a PDCCH in slot #n. The PDCCH includes DL scheduling information (e.g., DCI format 1_0 or 1_1). DCI format 1_0 or 1_1 may include the following information.

Frequency domain resource assignment: Indicates an RB set assigned to the PUSCH.

Time domain resource assignment: Indicates a slot offset K2 and the starting position (e.g. OFDM symbol index) and duration (e.g. the number of OFDM symbols) of the PUSCH in a slot. The starting symbol and length of the PUSCH may be indicated by a start and length indicator value (SLIV), or separately.

The UE may then transmit a PUSCH in slot #(n+K2) according to the scheduling information in slot #n. The PUSCH includes a UL-SCH TB.

Paging

The network may (i) access to UEs in RRC_IDLE, RRC_INACTIVE, and RRC_CONNECTED states by paging messages, and (ii) indicate a system information change and an earthquake and tsunami warning system/commercial mobile alert system (ETWS/CMAS) notification to UEs in the RRC_IDLE and RRC_INACTIVE states and UEs in the RRC_CONNECTED state by short messages. Both a paging message and a short message are transmitted based on a P-RNTI-based PDCCH. The paging message is transmitted on a logical channel, paging control channel (PCCH), whereas the short message is directly transmitted on a physical channel, PDCCH. Because the logical channel, PCCH is mapped to a physical channel, PDSCH, the paging message may be understood as scheduled based on a P-RNTI-based PDCCH.

While the UE stays in the RRC_IDLE state, the UE monitors a paging channel for core network (CN)-initiated paging. In the RRC_INACTIVE state, the UE also monitors the paging channel, for radio access network (RAN)-initiated paging. The UE does not need to monitor the paging channel continuously. Paging discontinuous reception (DRX) is defined as monitoring a paging channel only during one paging occasion (PO) per DRX cycle by a UE in the RRC_IDLE or RRC_INACTIVE state. A paging DRX cycle is configured by the network, as follows.

1) In the case of CN-initiated paging, a default cycle is broadcast in system information.
2) In the case of CN-initiated paging, a UE-specific cycle is configured by NAS signaling.
3) In the case of RAN-initiated signaling, a UE-specific cycle is configured by RRC signaling.

Because all of POs of the UE for CN-initiated signaling and RAN-initiated signaling are based on the same UE ID, the two POs overlap with each other. The number of POs in a DRX cycle may be set by system information, and the network may distribute UEs to the POs based on IDs.

When the UE is in the RRC_CONNECTED state, the UE monitors a paging channel in each PO signaled by system information, for an SI change indication and a PWS notification. In bandwidth adaptation (BA), the RRC_CONNECTED UE monitors only a paging channel in an active BWP in which a configured CSS is located.

In shared spectrum channel access, additional PDCCH monitoring occasions may be configured in a PO of the UE, for paging monitoring. However, when the UE detects a P-RNTI-based PDCCH transmission in its PO, the UE does not need to monitor subsequent PDCCH monitoring occasions in the PO.

To reduce power consumption, the UE may use DRX in the RRC_IDLE and RRC_INACTIVE states. The UE monitors one PO per DRX cycle. A PO is a set of PDCCH monitoring occasions, and may include multiple time slots (e.g., subframes or OFDM symbols) in which paging DCI may be transmitted. One paging frame (PF) is one radio frame and may include one or more POs or the starting points of one or more POs.

In a multi-beam operation, the UE assumes that the same paging message and the same short message are repeated in all transmission beams. The paging message is the same for both of RAN-initiated paging and CN-initiated paging.

Upon receipt of RAN-initiated paging, the UE initiates an RRC connection resume procedure. Upon receipt of CN-initiated paging in the RRC_INACTIVE state, the UE transitions to the RRC_IDL state and notifies the NAS of the CN-initiated paging.

A PF and a PO for paging are determined in the following manner

An SFN for the PF is determined by:

$$(SFN+PF\_offset) \bmod T=(T \text{ div } N)*(UE\_ID \bmod N)$$

An index i_s indicating the index of the PO is determined by:

$$i\_s=\text{floor}(UE\_ID/N) \bmod Ns$$

The following parameters may be used to calculate the PF and i_s above.
T: The DRX cycle of the UE (T is determined by the smallest of UE-specific DRX values (if configured by RRC and/or an upper layer) and a default DRX value broadcast in system information. In the RRC_IDLE state, if UE-specific DRX is not configured by an upper layer, the default value is applied).
N: Number of total paging frames in T
Ns: Number of POs for a PF
PF_offset: Offset used for PF determination
UE_ID: 5G-S-TMSI mod 1024
WUS (Wake-Up Signal)/PEI (Paging Early Indication)

Figure 8:
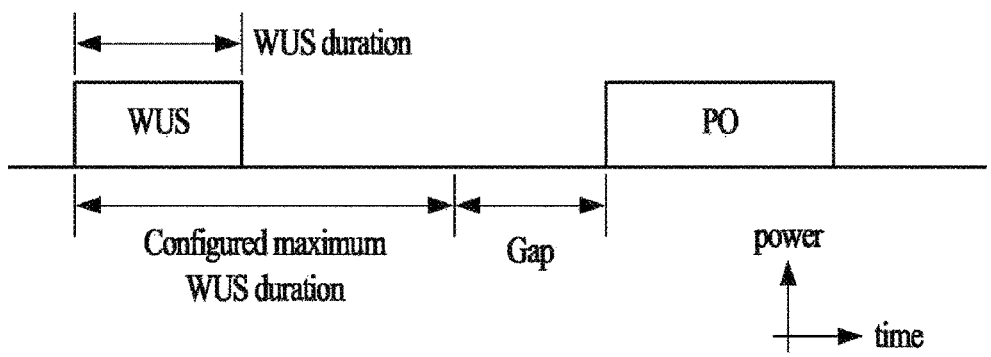
FIG. 8 illustrates an LTE-based wake-up signal.

In LTE Rel-15 NB-IoT and MTC, a wake-up signal (WUS) was introduced to save power of a UE. The WUS is a signal indicating preliminarily whether there is an actual paging transmission in a paging SS at a specific position. When the BS wants to transmit paging in a PO at a specific position, the BS may transmit a WUS at WUS transmission position(s) associated with the PO. The UE monitors the WUS transmission positions associated with the PO at the specific position. Upon detection of the WUS at the WUS transmission position(s), the UE may expect that paging will be transmitted in the PO, whereas when failing to detect the WUS at the WUS transmission position(s), the UE may not expect paging in the PO. The gain of power saving may be achieved by this operation. In LTE Rel-16 NB-IoT and MTC, a UE-group WUS was introduced to increase the power saving gain of the Rel-15 WUS. The UE-group WUS may advantageously reduce an unnecessary wakeup probability of a UE by using a WUS transmission position and sequence determined based on the UE-group ID of the UE. FIG. 8 is a diagram illustrating a WUS in an LTE system. Referring to FIG. 8, in MTC and NB-IoT, the WUS may be used to reduce power consumption related to paging monitoring. The WUS is a physical layer signal indicating whether a UE is supposed to monitor a paging signal (e.g., an MPDCCH/NPDCCH scrambled with a P-RNTI) according to a cell configuration. For a UE which is not configured with eDRX (i.e., configured only with DRX), the WUS may be associated with one PO (N=1). On the contrary, for a UE configured with eDRX, the WUS may be associated with one or more POs (N>1). Upon detection of the WUS, the UE may monitor N POs after being associated with the WUS. When failing to detect the WUS, the UE may maintain sleep mode by skipping PO monitoring until the next WUS monitoring. The UE may receive WUS configuration information from the BS and monitor the WUS based on the WUS configuration information. The WUS configuration information may include, for example, a maximum WUS duration, the number of consecutive POs associated with the WUS, and gap information. The maximum WUS duration may refer to a maximum time period during which the WUS may be transmitted, and may be expressed as a ratio to a maximum repetition number (e.g., Rmax) related to a PDCCH (e.g., MPDCCH or NPDCCH). Although the UE may expect repeated WUS transmissions within the maximum WUS duration, the number of actual WUS transmissions may be less than a maximum number of WUS transmissions within the maximum WUS duration. For example, the number of WUS repetitions may be small for a UE in good coverage. A resource/occasion in which the WUS may be transmitted within the maximum WUS duration is referred to as a WUS resource. The WUS resource may be defined as a plurality of consecutive OFDM symbols by a plurality of consecutive subcarriers. The WUS resource may be defined as a plurality of consecutive OFDM symbols by a plurality of consecutive subcarriers in a subframe or slot. For example, the WUS resource may be defined as 14 consecutive OFDM symbols by 12 consecutive subcarriers. Upon detection of the WUS, the UE does not monitor the WUS until a first PO associated with the WUS. When the WUS is not detected during the maximum WUS duration, the UE does not monitor a paging signal in POs associated with the WUS (or the UE remains in the sleep mode).

Even in a communication system such as NR, whether the UE needs to monitor paging DCI in a PO or whether the paging DCI is provided may be indicated through a PEI (e.g., PEI based on a sequence or DCI). Upon succeeding in detecting the PEI, the UE monitors the paging DCI (and/or a PDSCH carrying a corresponding paging message). Upon failing to detect the PEI, the UE may skip monitoring of the paging DCI in the PO.
[Paging Enhancement Based on Multiple P-RNTIs]

In a communication system such as LTE and NR, paging is used for the purpose such as RRC setup triggering, system information modification, and/or PWS/ETWS notification. When a UE monitors a PDCCH at a location of a PO configured by a BS and detects DCI scrambled with a P-RNTI, the UE may perform an operation indicated by the corresponding DCI.

In LTE Rel-15 NB-IoT and MTC, a WUS is introduced for power saving of the UE. The WUS is a signal indicating whether actual paging transmission exists in a PO at a specific location. When the BS intends to transmit paging to a PO of a specific location, the BS may transmit the WUS to a WUS transmission location(s) associated with the corresponding PO. A power saving gain may be obtained by an operation in which the UE monitors the WUS transmission location associated with the PO at the specific location, expects paging to be transmitted in the corresponding PO when a WUS is detected at the WUS transmission location, and does not expect paging in the corresponding PO when a WUS is not detected at the WUS transmission location. In LTE Rel-16 NB-IoT and MTC, a UE group WUS is introduced for the purpose of improving a power saving gain of the Rel-15 WUS. The UE group WUS may advantageously reduce a probability of unnecessary wake-up of the UE by using a transmission location and sequence of a WUS determined based on a UE group ID of the UE.

In Rel-16 NR, a DCI-based power saving scheme is introduced for the purpose of supporting power saving in a connected mode. To this end, a new DCI format 2-6 is introduced, and the UE is assigned a location of a bit to be monitored by the UE on the DCI format 2-6 by the BS, and determine a power saving operation in an active time interval based on information on the bit at the corresponding location.

As discussed in Rel-16 NB-IoT and MTC, when monitoring POs of UEs in an idle/inactive mode, unnecessary wake-up may occur when paging for different UEs sharing the same PO is transmitted, which increases power consumption of a UE. As mentioned above, in the current NR, a DCI-based method is introduced to obtain a power saving effect by reducing unnecessary monitoring of a UE in a connected mode, but the same (or similar) method is not defined in an idle/inactive mode. To this end, in Rel-17 NR, introduction of a paging early indication (PEI), which informs whether the UE needs to wake up in a PO, is discussed for the purpose of power saving of the UE. However, in most discussions of PEI methods, only a powering saving gain of a Rel-17 UE is considered, and an effect of powering saving on existing (e.g., NR Rel-15/16) UEs that do not provide a PEI function is not significantly considered. In addition, even if a PEI is introduced, there may be a limitation in obtaining an additional power saving gain such as cross slot scheduling with only the existing paging method because a backward compatibility issue with the existing UE needs to be considered at a PO location in which paging information is actually transmitted and received.

Based on this background, an example of the present disclosure proposes methods of indicating a P-RNTI of paging DCI that the UE needs to monitor in a PO using the PEI. The proposed methods may also advantageously provide a power saving gain to UEs that do not support a PEI function in a network situation in which transmission and reception of PEI is provided. In addition, a gain may be expected in that the UE providing a PEI function obtains an additional power saving gain at a location of the PO. Hereinafter, a method proposed mainly for transmission and reception of the PEI, which informs the UE of whether paging is transmitted or received, and transmission and reception operations in a PO related thereto, will be described, but it may be obvious to one of ordinary skill in the art that the present disclosure is not limited thereto and is generally applied to a relationship between a signal or channel indicating whether to transmit or receive a specific channel and the specific channel associated thereto.

As one example to which the proposed methods are applied, the methods may be used for the purpose of pre-transmitting and receiving related information prior to transmission of paging in a communication system such as LTE and NR. However, the proposed methods are not limited to the above example, and unless the spirit of the present disclosure is infringed, the proposed method may also be generally applied to another scheduling method by which transmission and reception of a specific signal/channel is expected.

Figure 9:
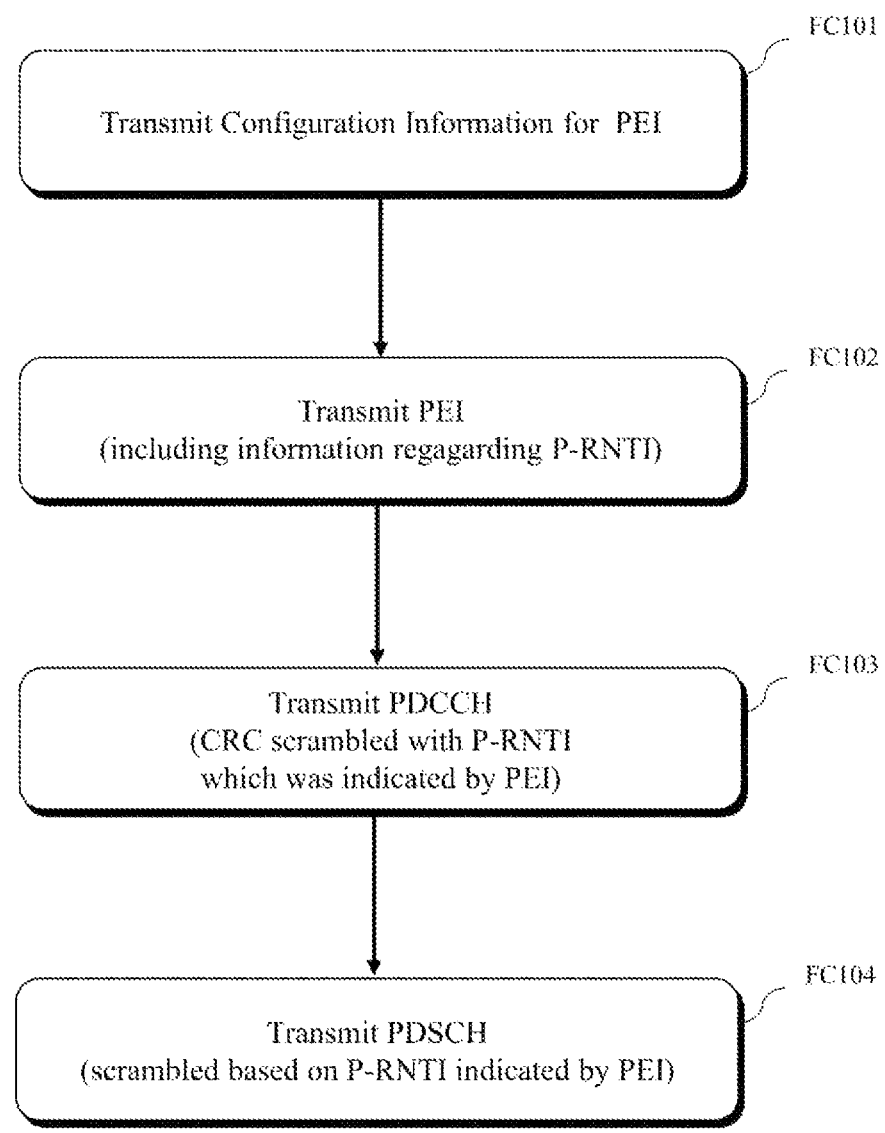
FIG. 9 illustrates a flowchart of a BS operation according to an embodiment of the present disclosure.
Figure 10:
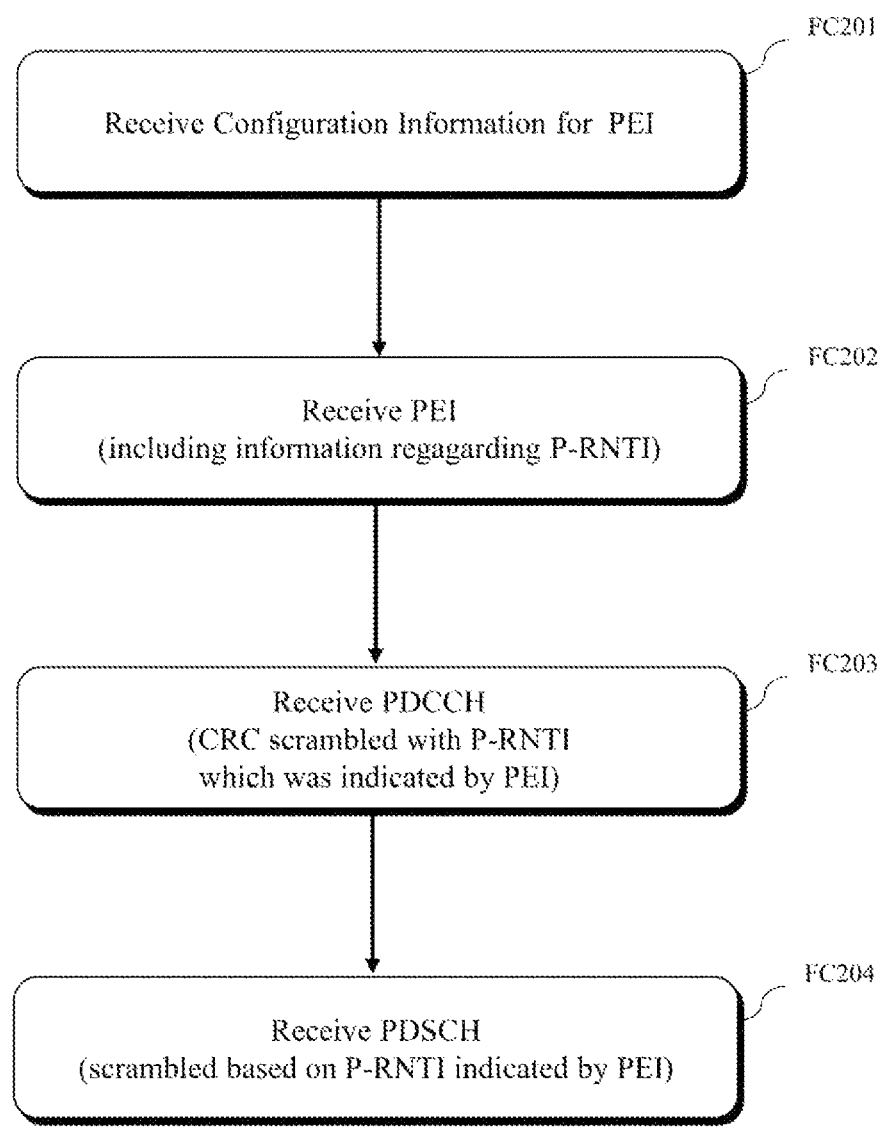
FIG. 10 illustrates a flowchart of a UE operation according to an embodiment of the present disclosure.

FIGS. 9 and 10 illustrate flowcharts of a BS operation and a UE operation to which the proposed method is applicable.

BS Operation

FIG. 9 illustrates a flowchart of a BS operation to which the proposed method is applicable.

Referring to FIG. 9, a BS may generate and transmit PEI-related configuration information for an operation proposed in the present disclosure (FC101). For example, the configuration information may be transmitted using a higher layer signal (e.g., SIB or RRC signaling).

When there is paging information to be transmitted to specific UE(s), the BS may transmit a PEI based on the configuration information (FC102). Information of the PEI may include information of a P-RNTI to be used in a PO associated with transmission of the corresponding PEI, and may be transmitted through a PDCCH or a DL signal.

Then, the BS may generate paging DCI according to the transmitted information of the PEI and transmit the same through the PDCCH (FC103). The transmitted information of the PEI may include P-RNTI information, and the P-RNTI information may be used for scrambling a CRC in transmission of the corresponding paging DCI. At this time, when there is a paging message to be transmitted by the BS and a PDSCH scheduling method is determined according to a value of the P-RNTI, the BS may apply this to a process of generating the paging DCI.

Then, the BS may transmit a PDSCH including a paging message based on scheduling information of the PDSCH transmitted through the PDCCH (FC104). When there is no paging message to be transmitted by the BS, this operation may be omitted.

UE Operation

FIG. 10 illustrates a flowchart of a UE operation to which the proposed method is applicable.

Referring to FIG. 10, the UE may expect that the proposed operation is supported when receiving configuration information related to a PEI from a BS (FC201). For example, the configuration information may be received using a higher layer signal (e.g., SIB or RRC signaling).

The UE may attempt to detect the PEI based on the received PEI-related configuration information and receive the PEI (FC202). At this time, information included in the PEI may include P-RNTI information to be used in a PO associated with reception of the corresponding PEI, and may be transmitted through a PDCCH or a DL signal.

Then, when the UE is instructed to perform a reception operation in the associated PO through the PEI at a location at which the PEI is received, the UE may monitor a PDCCH for paging DCI detection at the location of the associated PO (FC203). At this time, the UE may assume that the paging DCI is CRC-scrambled by the P-RNTI obtained through the received PEI. At this time, when a PDSCH scheduling method is determined according to a P-RNTI value and a paging message to be received by the UE is scheduled, the UE may interpret scheduling information included in the corresponding paging DCI based on the used P-RNTI value.

Then, PDSCH reception may be performed based on the instructed PDSCH scheduling information (FC204). When the corresponding UE is instructed that there is no PDSCH transmission for the corresponding UE in a previous step, the corresponding operation may be omitted.

One or more of the following methods may be applied in combination. Each method may be operated in an independent form without a separate combination, or one or more methods may be combined and operated in a related form. Some terms, symbols, and orders used to describe the present disclosure may be replaced with other terms, symbols, and orders as long as the principles of the present disclosure are maintained.

Hereinafter, an example of a signal or a channel for the purpose of pre-transmitting and receiving related information prior to transmission of paging, in particular, the purpose of notifying whether or not paging is transmitted will be described to explain the principle of the present disclosure, but proposed methods are not limited to a type of a physical channel or the purpose of information transmitted therethrough unless otherwise specified. Therefore, the proposed methods may be applied to all types of physical channels and the purpose of information transmitted therethrough as long as the principle of the present disclosure is not infringed, unless otherwise described.

Hereinafter, an example will be described based on an NR system to explain the principle of the present disclosure, but the proposed methods do not specify and limit the transmission and reception form of NR unless otherwise specified. Therefore, the proposed methods may be applied to all structures of wireless communication transmission and reception as long as the principle of the present disclosure is not infringed unless otherwise specified.

Hereinafter, for convenience of explanation, the following terms are defined and used. The terms defined and used below are terms used to help understand the present disclosure and are not limited to the terms used in the concepts proposed in the present disclosure.

In this specification, a signal or channel configured to indicate whether to transmit a paging PDCCH/PDSCH for a specific PO is defined and described as a paging early indication (PEI). In this specification, the present disclosure is mainly described in terms of a PEI configured to provide information in the form of DCI, but the proposed method may also be applied to other types of PEI (e.g., distinguishing information through sequences) even if there is no separate explanation.

In this specification, an RNTI applied to CRC scrambling of paging DCI (i.e., DCI format 1_0) at a location in a PO is defined and described as a P-RNTI. In addition, a P-RNTI (P-RNTI used for the purpose of supporting an NR Rel-15/16 UE) to be expected by a UE that does not expect a PEI function may be defined and described as P #1-RNTI for convenience, and a P-RNTI (used for CRC scrambling of paging DCI in addition to the P #1-RNTI) to be newly used using the method proposed in the present disclosure may be defined and described as P #2-RNTI. In this specification, unless otherwise specified, the term P-RNTI defined above is used as a concept that includes both P #1-RNTI and P #2-RNTI or refers to at least one of P #1-RNTI and P #2-RNTI depending on the context.

In this specification, a UE that expects a plurality of P-RNTIs at a location of a PO is defined and described as an MP-capable UE. Conversely, a UE that expects only one P-RNTI at the location of the PO is defined and described as a non-MP-capable UE.

In this specification, DCI (or DCI including the PEI) used for transmission and reception of the PEI is defined and described as PEI-DCI.

(Method 1) Indication of P-RNTI in PO Using PEI

An example of the present disclosure proposes a method of designating a P-RNTI value to be expected by a UE in a PO of an associated location through transmission and reception of a PEI. To this end, information transmitted/received through the PEI may be determined to include information on a P-RNTI to be applied to a PDCCH or a PDSCH for paging transmitted and received in the associated PO. To this end, a plurality of P-RNTIs to be used for paging transmission in a specific PO may be configured. For example, the plurality of P-RNTIs may be two, and in the following description, a proposed operation based on two P-RNTIs will be described. However, the number of P-RNTIs used in the description of the method proposed in the present disclosure is only an example, and the proposed method is applicable even when two or more P-RNTIs are used.

The aforementioned fact that the P-RNTI is applied to the PDCCH for paging may mean that the P-RNTI is used for CRC scrambling when DCI format 1_0 is transmitted and received in a PO. In addition, the aforementioned fact that P-RNTI is applied to the PDSCH for paging means that a RNTI parameter among PDSCH scrambling parameters (used for PDSCH transmission scheduled by a PDCCH in a PO for transmission of a paging message) is configured to a P-RNTI. In this case, a P-RNTI value used in the PDCCH and a P-RNTI value used in the PDSCH scheduled by the corresponding PDCCH may be determined to be the same.

A specific example of a UE operation when the proposed method is applied may be as follows. An MP-capable UE may expect that one of a plurality of P-RNTIs is selected at a location of a PO and used for paging transmission, and the plurality of P-RNTIs may include P #1-RNTI to be transmitted for a non-MP-capable UE and P #2-RNTI to be transmitted for an MP-capable UE. In contrast, the non-MP-capable UE may expect only one P-RNTI in paging transmission at the location of the PO, and the expected one P-RNTI may be determined to be P #1-RNTI.

In addition, the UE may expect to receive the PEI at a transmission/reception location/opportunity (hereinafter referred to as "PEIO") of the PEI. When the UE succeeds in detecting the PEI in the PEIO and needs to wake up at the location of the PO associated with the PEIO, the UE may acquire a P-RNTI value (from the detected PEI) to be used at the location of a PO associated with the corresponding PEIO. Then, the corresponding UE may perform a paging reception procedure based on the acquired P-RNTI value at the location of the PO indicated by the PEI. At this time, the paging reception procedure may include at least one of (i) a PDCCH BD procedure for decoding DCI format 1_0 that is CRC-scrambled with the acquired P-RNTI, and (ii) a procedure of receiving a PDSCH scrambled with the acquired P-RNTI. For example, the proposed method may be determined to be applied only when the P-RNTI acquired from the PEIO is included in a set of P-RNTI(s) to be expected by the UE. For example, in a situation in which a non-MP-capable UE expects only P #1-RNTI and monitors the PEIO, when the corresponding UE identifies a PEI indicating information of P #2-RNTI, the PEI may be determined not to be used (e.g., not to expect paging reception in a PO).

A specific example of an operation of a BS when the proposed method is applied may be as follows. The BS may include information on a P-RNTI to be applied at the location of the PO in the associated PEI and transmit the same. After PEI transmission, the BS may perform a paging transmission procedure based on a P-RNTI indicated through the PEI. The paging transmission procedure may include at least one of (i) transmission of DCI format 1_0 scrambled with the indicated P-RNTI and (ii) transmission of a PDSCH scrambled with the indicated P-RNTI.

Figure 11:
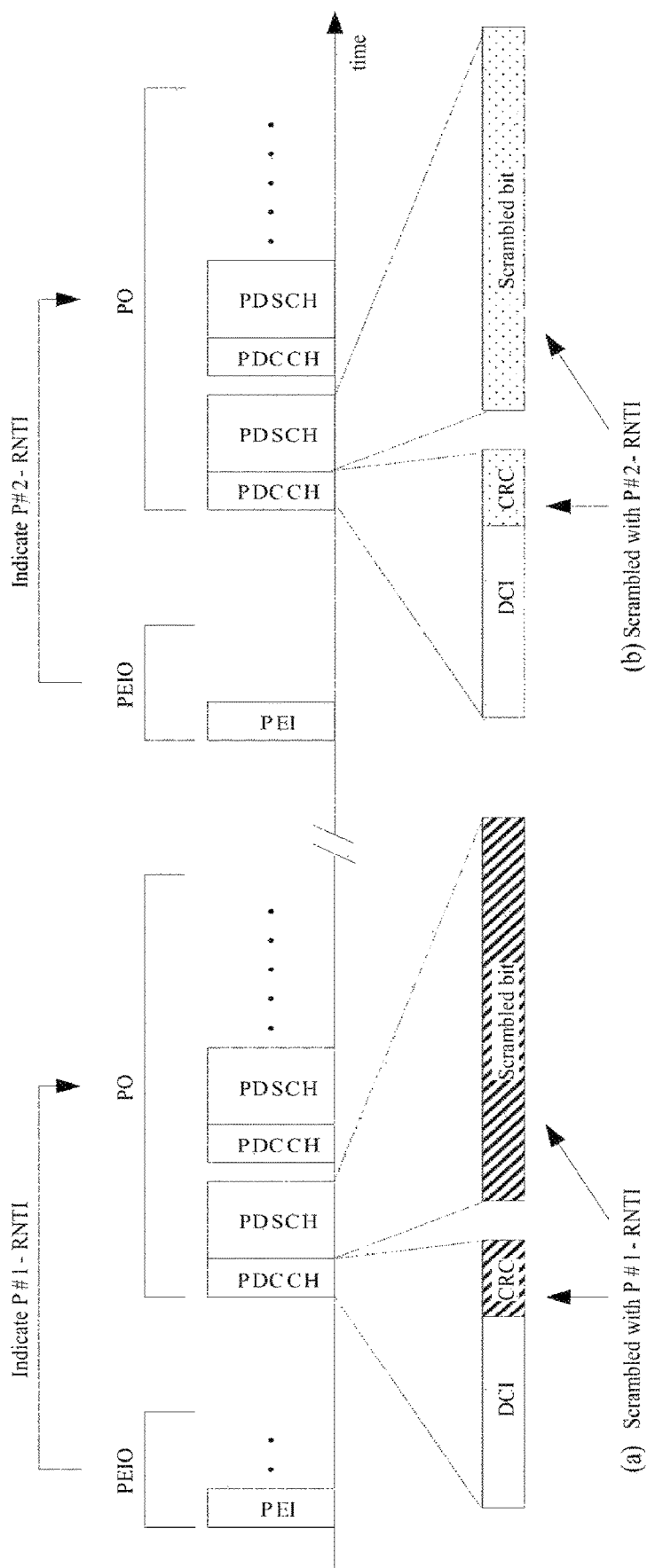
FIGS. 11 and 12 are diagrams for explaining a procedure of transmitting and receiving a PEI and paging according to an embodiment of the present disclosure.

FIG. 11 shows an implementation example of Method 1. Referring to FIG. 11, it is assumed that the P-RNTI indicated by the PEI is equally applied across all PDCCH monitoring occasions constituting the PO. Like the PO, the PEI may also be configured with a plurality of monitoring occasions corresponding to a plurality of SSB beams in a PEIO interval, and one UE may determine to assume that the same PEI is repeated in the PEIO interval (in this case, the PEI includes the information of the P-RNTI). In the example of FIG. 11, CRC means CRC applied to transmission of paging DCI, and CRC scrambling of paging DCI is performed by a P-RNTI indicated by the PEI. In addition, a scrambled bit means a scrambled bit (a step immediately before modulation is applied) generated during a PDSCH transmission process accompanying the paging message, and indicates that PDSCH scrambling is applied based on the information of the P-RNTI indicated by the PEI. Although FIG. 11 shows a case in which both a PDCCH and a PDSCH are transmitted in a PO, transmission of the PDSCH may be omitted when a short message indicator of paging DCI transmitted through the PDCCH indicates the 'only short message'. FIG. 11 shows only an example to which the proposal of the present disclosure is applied, and the content proposed in the present disclosure is not limited to this example.

For Method 1, a UE operation of acquiring the information of the P-RNTI through the PEI transmitted by a BS may be defined. A method of transmitting and receiving the information of the P-RNTI used for paging transmission in a PO through PEI is proposed, and in detail, Method 1-1 or method 1-2 may be used.

(Method 1-1) Indication of P-RNTI Using DCI Field of PEI

As an example of Method 1-1, a BS may explicitly configure information of a P-RNTI in a DCI field constituting a PEI. Specifically, DCI (hereinafter referred to as PEI-DCI) transmitted in a PEIO may be determined to include an n-bit P-RNTI indication field. In this case, the size of n may be a value determined by the number of P-RNTIs to be used for transmission and reception of paging in the PO. For example, when the number of P-RNTIs used is $N_P$, the size of n may be determined as $n=\log_2 N_P$. x may mean an integer value greater than or equal to x. As an example of the case of $N_P=2$, the P-RNTI indication field may be configured with 1 bit, and when the 1 bit specifies a value of 1, this means P #1-RNTI, and when the 1 bit specifies a value of 0, this means that a value of P #2-RNTI is to be used for the purpose of paging in the PO.

A specific example of a UE operation when the proposed method is applied may be as follows. The UE may expect to receive the PEI at a transmission/reception location of the PEI (hereinafter referred to as a PEIO), and when the UE succeeds in detecting PEI-DCI in the PEIO, the UE may the information of the P-RNTI through the P-RNTI indication field. Then, the UE may assume that the P-RNTI indicated through the PEI-DCI is used for paging transmission and reception at a location of the associated PO.

A specific example of a BS operation when the proposed method is applied may be as follows. The BS may include the information of the P-RNTI to be applied at the location of the PO in the associated PEI transmission and transmit the same, and in this case, the information of the P-RNTI may be expressed in the P-RNTI indication field on the PEI-DCI. Then, the BS may perform an operation for paging transmission at the location of the associated PO based on the information of the P-RNTI transmitted through the PEI.

As in the method proposed in the present disclosure, when the information of the P-RNTI is provided through the DCI field constituting the PEI-DCI, the UE may advantageously acquire PEI including P-RNTI information with only one decoding operation.

(Method 1-2) P-RNTI Indication Based on RNTI of PEI

As an example of method 1-2, information of a P-RNTI (for PDCCH/PDSCH) transmitted from an associated PO may be provided using an RNTI applied to PEI-DCI (CRC scrambling) including a PEI. Specifically, the information of the P-RNTI used in the PO may be determined to be indicated through an RNTI used for CRC scrambling of PEI-DCI transmitted in an PEIO. For example, the RNTI used for CRC scrambling of PEI-DCI and the P-RNTI used for paging transmission in the associated PO may be configured identically.

A specific example of a UE operation when the proposed method is applied may be as follows. The UE may expect to receive the PEI in the PEIO, and at this time, it may be assumed that CRC of the PEI-DCI is scrambled to one of a plurality of P-RNTIs. When the UE succeeds in detecting the PEI-DCI using a specific P-RNTI among the plurality of P-RNTIs, the corresponding UE may assume that the specific P-RNTI used for successful detection is used for paging transmission and reception of the associated PO.

A specific example of a BS operation when the proposed method is applied may be as follows. The BS may scramble the CRC of the PEI-DCI transmitted at the location of the associated PEIO using the P-RNTI to be applied at the location of the PO. Then, the BS may perform an operation for paging transmission at the location of the associated PO based on the same P-RNTI used for transmission of the PEI.

When P-RNTI scrambling information of the PO is provided using the RNTI used for scrambling of CRC of the PEI-DCI, the information may be advantageously provided without increasing a bit of the PEI-DCI. In addition, when P-RNTIs applied to the PO and the PEIO are configured to be the same, there may be an advantageous in terms of saving an RNTI resource because the RNTI resource is recycled.

Method 1 is applied, and when the UE does not detect a PEI in a section of a PEIO, the UE may determine to assume that the P-RNTI (i.e., P #1-RNTI) expected by the existing UEs is transmitted at the location of the associated PO. When the BS intends to perform paging transmission only for a non-MP-capable UE, P #1-RNTI may be applied to the PO, and simultaneously, (unnecessary) PEI transmission may be omitted. Assuming the existing method in which only one P-RNTI is defined, the BS is not capable of distinguishing between a case in which the BS omits the PEI and a case in which the UE fails to detect the PEI from a point of view of the UE, and thus this may be to define a basic operation to be assumed (e.g., distinction through P #1-RNTI/P #2-RNTI).

For Method 1, the BS may transmit information related to the proposal through higher layer signaling such as an SIB. The UE may receive related information transmitted by the BS and perform a reception operation of the PEI and paging based thereon.

Method 1 has an advantageous effect in terms of obtaining a kind of UE sub-grouping effect for preventing unnecessary wake-up of UEs that do not support a PEI operation in a network situation in which a power saving effect of a UE is expected through the PEI operation.

(Method 2) Determination of PDSCH Scheduling Method Based on P-RNTI of PO Indicated by PEI An example of the present disclosure proposes a method of determining a PDSCH scheduling scheme according to a P-RNTI value used for paging transmission/reception in a PO. In the proposed method, the configuration and interpretation of PDSCH scheduling information (e.g., DCI field for scheduling a PDSCH scheduled by DCI) included in the corresponding DCI may be determined according to a P-RNTI value applied to DCI (e.g., DCI format 1_0) transmitted and received in the PO for the purpose of paging. Characteristically, for example, a method of determining the configuration and interpretation of (at least) time domain resource assignment (TDRA) field among DCI fields for scheduling of a PDSCH according to a value of a P-RNTI applied to DCI (e.g., DCI format 1_0) scrambled with a P-RNTI may be proposed. The DCI field for PDSCH scheduling to be determined according to a P-RNTI value may include other DCI fields (e.g., frequency domain resource assignment (FDRA), modulation and coding scheme (MCS), and TB scaling), and the proposed method may also be additionally applied to the DCI fields.

Specifically, when a TDRA used in a case in which the P-RNTI used in the PO is P #1-RNTI (i.e., a P-RNTI to be used by an existing UE) is TDRA #1 (e.g., TDRA table configuration #1), and a TDRA used in a case in which the P-RNTI used in the PO is P #2-RNTI is TDRA #2 (e.g., TDRA table configuration #2), TDRA #1 may be determined to be the same as the existing TDRA (the existing TDRA table configuration) used by the existing UE (e.g., NR Rel-15/16), and TDRA #2 may be designated/configured (separately) with a value different from (at least a part of) the existing TDRA.

Table 5 below illustrates Default PDSCH TDRA Table A defined in 3GPP NR 38.214.

TABLE 5

| Row index | dmrs-TypeA-Position | PDSCH mapping type | $K_0$ | S | L |
|---|---|---|---|---|---|
| 1 | 2 | Type A | 0 | 2 | 12 |
|   | 3 | Type A | 0 | 3 | 11 |
| 2 | 2 | Type A | 0 | 2 | 10 |
|   | 3 | Type A | 0 | 3 | 9 |
| 3 | 2 | Type A | 0 | 2 | 9 |
|   | 3 | Type A | 0 | 3 | 8 |
| 4 | 2 | Type A | 0 | 2 | 7 |
|   | 3 | Type A | 0 | 3 | 6 |
| 5 | 2 | Type A | 0 | 2 | 5 |
|   | 3 | Type A | 0 | 3 | 4 |
| 6 | 2 | Type B | 0 | 9 | 4 |
|   | 3 | Type B | 0 | 10 | 4 |
| 7 | 2 | Type B | 0 | 4 | 4 |
|   | 3 | Type B | 0 | 6 | 4 |
| 8 | 2, 3 | Type B | 0 | 5 | 7 |
| 9 | 2, 3 | Type B | 0 | 5 | 2 |
| 10 | 2, 3 | Type B | 0 | 9 | 2 |
| 11 | 2, 3 | Type B | 0 | 12 | 2 |
| 12 | 2, 3 | Type A | 0 | 1 | 13 |
| 13 | 2, 3 | Type A | 0 | 1 | 6 |
| 14 | 2, 3 | Type A | 0 | 2 | 4 |
| 15 | 2, 3 | Type B | 0 | 4 | 7 |
| 16 | 2, 3 | Type B | 0 | 8 | 4 |

As described above, in Table 5, $K_0$ represents a slot offset, S represents a start symbol, and L represents a length.

As an example, as shown in Table 5, one of the (existing) TDRA tables to be configured even for the (existing) UE that do not expect a PEI may be TDRA #1, and a TDRA table that is (additionally) configured only for a UE configured to monitor the PEI may be used as TDRA #2. TDRA #2 may have at least one entry (or at least one element) different from TDRA #1.

In this case, the TDRA #2 may be determined to facilitate cross slot scheduling (a type in which a PDCCH and a scheduled PDSCH are transmitted and received in different slots) for the PDSCH. Most of entries of the existing TDRA table configured through the current paging DCI are values indicating the same slot scheduling (the form in which the PDCCH and the scheduled PDSCH are transmitted and received in the same slot) (i.e., $K_0$=0), and some entries of the TDRA table are designed to enable cross slot scheduling ($K_0$=1) of 1 slot size (limited to limited cases). Therefore, it is not certain that cross slot scheduling is applied in a step in which the UE performs BD of paging DCI, and in the step of performing BD of paging DCI, the UE needs to always perform DCI processing and PDSCH reception preparation operations in preparation for the same slot scheduling. For example, when the (existing) TDRA table configured in the UE includes at least one entry for the same slot scheduling (i.e., $K_0$=0), there is a possibility in that a TDRA field of the paging DCI indicates an entity for the same slot scheduling (i.e., $K_0$=0), and thus the UE needs to prepare for potential PDSCH scheduling as well as DCI on the same slot in BD paging DCI. (Compared to the case in which cross slot scheduling is ensured), the same slot scheduling preparation operation of the UE requires a lot of power consumption, and specifically, the UE performs high-speed processing to complete processing within a short time (due to the same slot characteristics), and it is necessary to perform channel estimation with high accuracy based on signals to receive even the PDSCH (designed to have less robustness than the PDCCH).

(In the case of cross slot scheduling), when a UE is capable of skipping preparation for PDSCH reception that is not needed (on the same slot), a power saving gain may be obtained, but there is a problem in that the UE, which is not capable of knowing whether to perform cross clot scheduling, is not capable of skipping the preparation for PDSCH reception. In order to overcome the problem, all scheduling values constituting TDRA #2 may be determined to support cross slot scheduling.

As a specific method of cross slot scheduling through TDRA #2 in the proposed method, values constituting TDRA #2 may be determined to be configured in the form of a slot offset (additional to slot offset $K_0$ included in each entry) of TDRA #1.

As an example, when one of Table 5.1.2.1.1-2 (Table 5), Table 5.1.2.1.1-3, Table 5.1.2.1.1-4, and Table 5.1.2.1.1-5 of NR TS 38.214 spec is configured to be used to determine a value of TDRA #1, UEs that receive scheduling based on TDRA #2 may determine to replace and interpret a $K_0$ value indicating a slot offset among table values used in TDRA #1 with another value. As a specific method of replacing the $K_0$ value with another value, when the $K_0$ value used in TDRA #1 is $K_0$ #1, the $K_0$ value of TDRA #2 of the same row index may be determined to be calculated as $K_0$ #2(=$K_0$ #1+add_offset). In this case, the add_offset value is a value previously agreed upon between the BS and the UE, and may be a value that is determined by standards or a value that the BS is capable of configuring through higher layer signaling such as an SIB. At this time, when there are multiple P-RNTIs to be used only for MP-capable UEs (i.e., when multiple P #2-RNTIs exist), $K_0$ #2 (or add_offset) with different values may be used according to different values of P #2-RNTI. When separate information for TDRA #2 is not included in Radio resource control information elements of 'pdsch-ConfigCommon' provided through an SIB, default information may be determined to be applied according to a multiplexing pattern of an SSB and a CORESET.

As a specific method of cross slot scheduling through TDRA #2, separate higher layer signaling for configuring TDRA #2 may be provided. For example, a method of configuring/indicating separate information for TDRA #2 in Radio resource control information elements of 'pdsch-ConfigCommon' provided through the SIB may be used. The separate information may be configured in a format similar to 'pdsch-TimeDomainAllocationList' that is a field to be configured on the 'pdsch-ConfigCommon' to configure TDRA #1. Alternatively, the separate information may be information indicating an add_offset value for 'pdsch-TimeDomainAllocationList' configuring TDRA #1.

For the case where $K_0$ #2 is used, at least one of S and/or L values may be separately configured, or an additional offset of S and/or L values may be configured for $K_0$ #1. Alternatively, even if $K_0$ #2 is used, the S and/or L value may be configured equal to the S and/or L value for $K_0$ #1. Depending on implementation, one or more TDRA #2 tables may be configured.

A specific example of a UE operation when the proposed method is applied may be as follows. When the UE monitors the PDCCH at the location of the PO and succeeds in detecting the DCI (e.g., DCI format 1_0), if the CRC of the detected DCI is scrambled using P #1-RNTI, the UE may expect to schedule a time domain resource of the PDSCH based on TDRA #1 and interpret the TDRA field of the DCI based on TDRA #1. When CRC of the DCI detected by the UE is scrambled with P #2-RNTI, the UE may expect to schedule the time domain resource of the PDSCH based on TDRA #2 and interpret the TDRA field of the DCI based on TDRA #2.

A specific example of a BS operation when the proposed method is applied may be as follows. The BS may scramble the CRC of the PEI-DCI transmitted at the location of the associated PEIO using the P-RNTI to be applied at the location of the PO. Then, the BS may perform an operation for paging transmission at the location of the associated PO by applying the P-RNTI used for transmission of the PEI in the same way.

Method 2 has an advantageous effect in that when a plurality of UEs with different capabilities monitor the same search space (SS), a UE as a transmission and reception target is identified through an RNTI, and information transmitted and received is applied differently. As an example, as proposed in the present disclosure, considering the case in which a non-MP-capable UE expecting only reception of P #1-RNTI and an MP-capable UE capable of expecting reception of both P #1-RNTI and P #2-RNTI monitor the same PO, when the non-MP-capable UE is included in the UEs that the BS intends to provide paging, P #1-RNTI may be used, and when the non-MP-capable UE is not included in UEs to which the BS intends to provide paging, P #2-RNTI may be used. Through this, there is an advantage in that a power saving gain is obtained by preventing unnecessary wake-up of the non-MP-capable UE. In addition, when the non-MP-capable UE is not included in UEs to which paging is to be provided, there may be an advantageous in that TDRA information advantageous to the corresponding UE is separately designated.

Method 2 may be used in combination with Method 1, and in this case, a specific example of a UE operation may be as follows. The UE may expect reception of the PEI at the location of the PEIO and monitor the same, and when the UE succeeds in detecting the PEI, the UE may acquire a P-RNTI value to be used in the PO through the corresponding detection result. Then, the UE may perform PDCCH decoding based on the acquired P-RNTI information at the location of the PO associated with the PEIO. At this time, when the acquired P-RNTI corresponds to P #1-RNTI, the UE may expect a time domain resource of a PDSCH of which scheduling information received in the PO is determined based on TDRA #1, and when the P-RNTI corresponds to P #2-RNTI, the UE may expect a time domain resource of a PDSCH of which scheduling information received in the PO is determined based on TDRA #2.

When Method 2 is used in combination with Method 1, a specific example of a BS operation may be as follows. The BS may include P-RNTI information to be applied at the location of the PO in the associated PEI and transmit the same. After transmitting the PEI, the BS may perform a paging transmission procedure based on the P-RNTI information indicated by the PEI.

As in the proposed method, when the P-RNTI information is transmitted and received through the PEI, and a PDSCH scheduling method is determined at the location of the PO accordingly, the UE may assume a scheduling method to be applied in the PO in advance at a PEI reception step and prepare for a decoding method accordingly. When the designated scheduling method supports the form of cross slot scheduling, the UE may determine not to prepare in advance for decoding of the PDSCH in a slot in which decoding of the paging DCI is performed, which is advantageous in that unnecessary power consumption is reduced.

Figure 12:
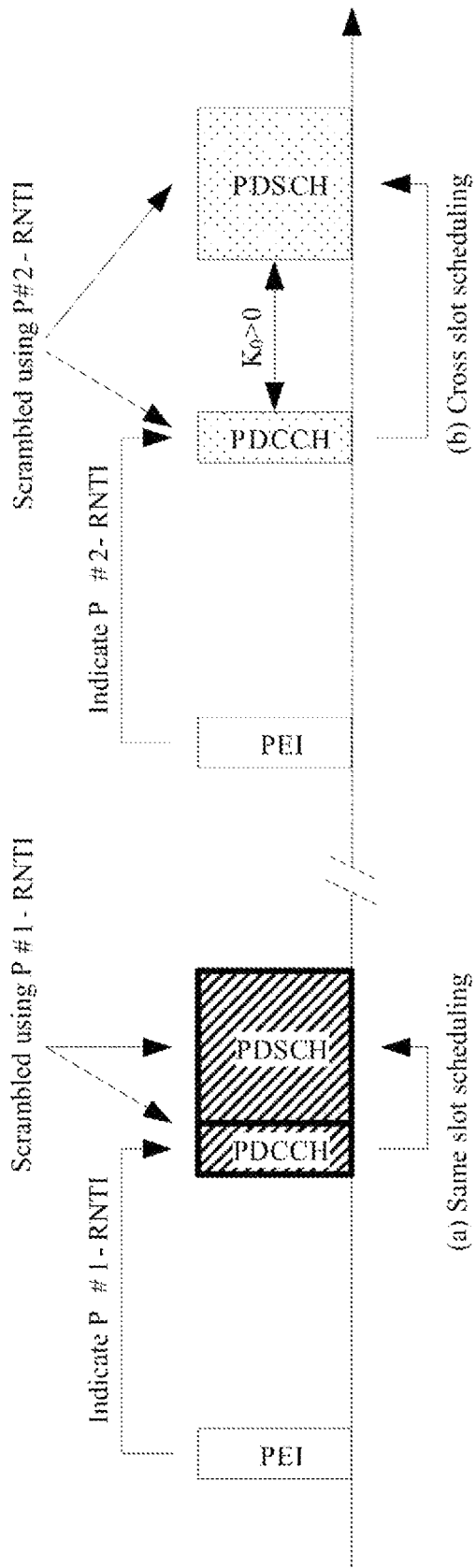

FIG. 12 shows an example of a PEI and paging transmission/reception procedure when Methods 1 and 2 are used in combination as described above. As shown in the example of FIG. 12, PEI transmitted and received in a PEIO may indicate a P-RNTI value to be used in a PO, and a PDSCH scheduling method may be determined according to the indicated P-RNTI value.

Figure 13:
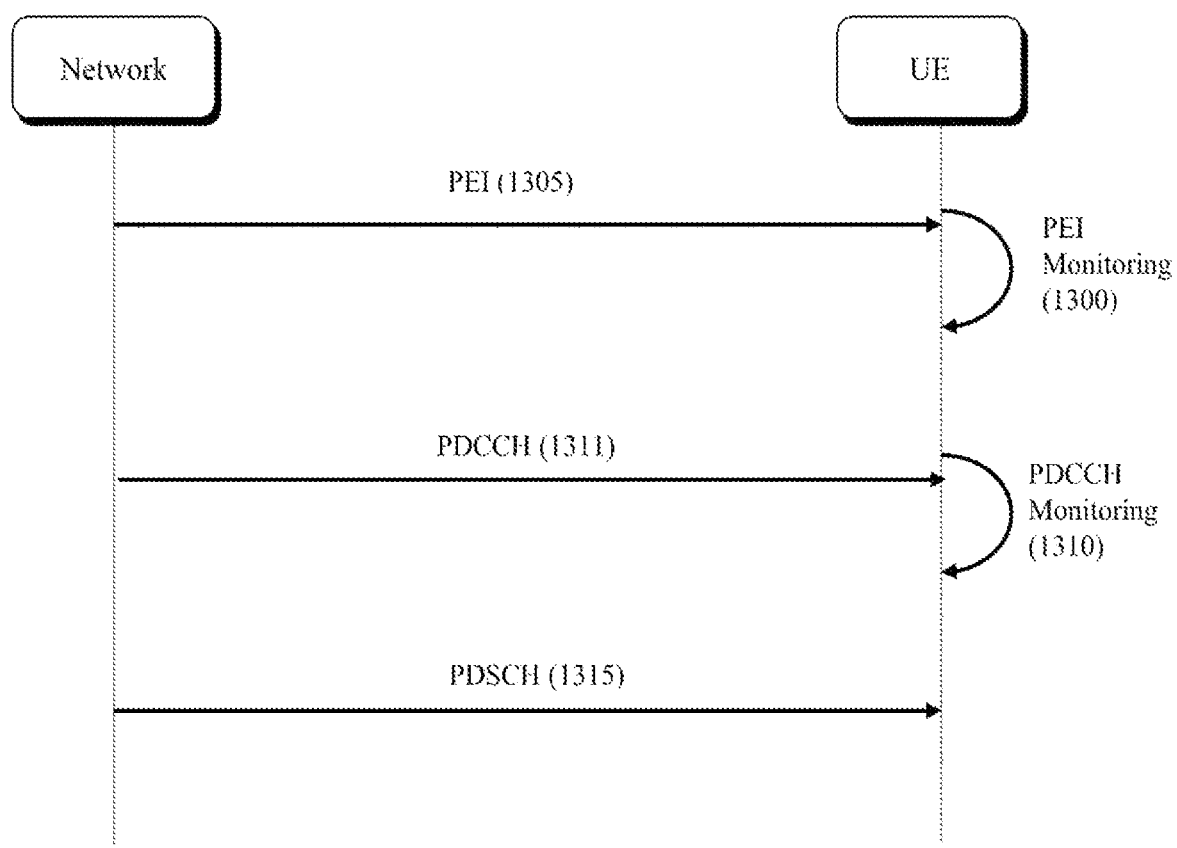
FIG. 13 illustrates a flow of a method for transmitting and receiving a signal according to an embodiment of the present disclosure.

FIG. 13 illustrates a flow of a method for transmitting and receiving a signal according to an embodiment of the present disclosure. FIG. 13 shows a specific implementation example of the above-described examples, and thus the scope of the present disclosure is not limited to FIG. 13. The contents described above may be referenced for FIG. 13.

According to the embodiment of FIG. 13, power saving for the existing (e.g., NR Rel-15/16) UEs that do not provide a PEI function may be improved, and an additional power saving gain may be obtained for PEI-supporting UEs through cross slot scheduling.

Referring to FIG. 13, the UE may monitor a paging early indication (PEI) (1300). The BS may transmit the PEI (1305).

The UE may monitor a physical downlink control channel (PDCCH) on a paging occasion (PO) related to the PEI based on detection of the PEI (1310). After transmitting the PEI, the BS may transmit a physical downlink control channel (PDCCH) on a paging occasion (PO) related to the PEI (1311).

The UE may receive a physical downlink shared channel (PDSCH) based on downlink control information (DCI) carried by the PDCCH (1315). The BS may transmit a physical downlink shared channel (PDSCH) based on downlink control information (DCI) carried by the PDCCH.

A slot in which the PDSCH is to be received may be determined/indicated based on one of a plurality of time domain resource allocation (TDRA) tables configured in the UE and a value 'N' of a TDRA field included in the DCI.

The plurality of TDRA tables may include a first TDRA table including at least one entry for the same slot scheduling of the PDCCH and the PDSCH and a second TDRA table including only entries for cross-slot scheduling of the PDCCH and the PDSCH.

Whether the value 'N' of the TDRA field indicates the entry 'N' of the first TDRA table or the entry 'N' of the second TDRA table may be determined based on the PEI.

The UE may determine one TDRA table related to the value 'N' of the TDRA field among the plurality of TDRA tables based on whether the PEI is related to a first radio network temporary identifier (RNTI) or a second RNTI.

The first RNTI may be configured regardless of UE capability to detect the PEI, and the second RNTI may be configured based on the fact that the UE has UE capability to detect the PEI.

The UE may determine that the value 'N' of the first TDRA field indicates an entry 'N' of the first TDRA table based on that the first RNTI is used for cyclic redundancy check (CRC) scrambling, or determine that the value 'N' of the second TDRA field indicates an entry 'N' of the second TDRA table based on the fact that the second RNTI is used for the CRC scrambling.

The CRC scrambling may include at least one of CRC scrambling of the PEI and CRC scrambling of the PDCCH.

Based on the detection of the PEI, the UE may determine whether the PDSCH scheduled by the DCI is to be scheduled only after a slot in which the DCI is received before decoding of the DCI carried by the PDCCH is completed.

In a state in which the second TDRA table is selected based on the PEI, the UE may assume that the PDSCH is not scheduled on the same slot as the PDCCH.

At least one of the PDCCH and the PDSCH may be scrambled based on a radio network temporary identifier (RNTI) indicated through the PEI.

Each entry of each TDRA table may indicate a combination of {slot offset, start symbol, and length} for the corresponding PDSCH time resource.

[Paging Early Indication at PO]

As described above, in the Rel-17 NR, introduction of a paging early indication (PEI), which informs whether the UE needs to wake up in the PO, is being discussed for the purpose of power saving of the UE. However, when such a new signal or channel is introduced as the PEI, resource overhead for downlink transmission (e.g., downlink transmission of a PEI) may occur prior to paging transmission, which may be a burden on the network side.

An example of the present disclosure proposes methods of providing a PEI function using an existing PO location (resource). The proposed methods have an advantage of minimizing occurrence of network overhead while inducing a power saving gain of the UE by providing the PEI function. Hereinafter, a method proposed mainly for the PEI function, which informs the UE of whether paging is transmitted or received in advance, is described, but one of skill in the art will understand that the present disclosure is not limited thereto and is extensively applied to provision of other functions using the location of the PO.

As one example to which the proposed methods are applied, the proposed methods may be used for the purpose of pre-transmitting and receiving related information prior to transmission of paging in a communication system such as LTE and NR. However, the proposed methods are not limited to the above examples, and unless the spirit of the present disclosure is infringed, the proposed method may be generally applied to other scheduling methods by which transmission and reception of a specific signal/channel is expected.

BS Operation

Figure 14:
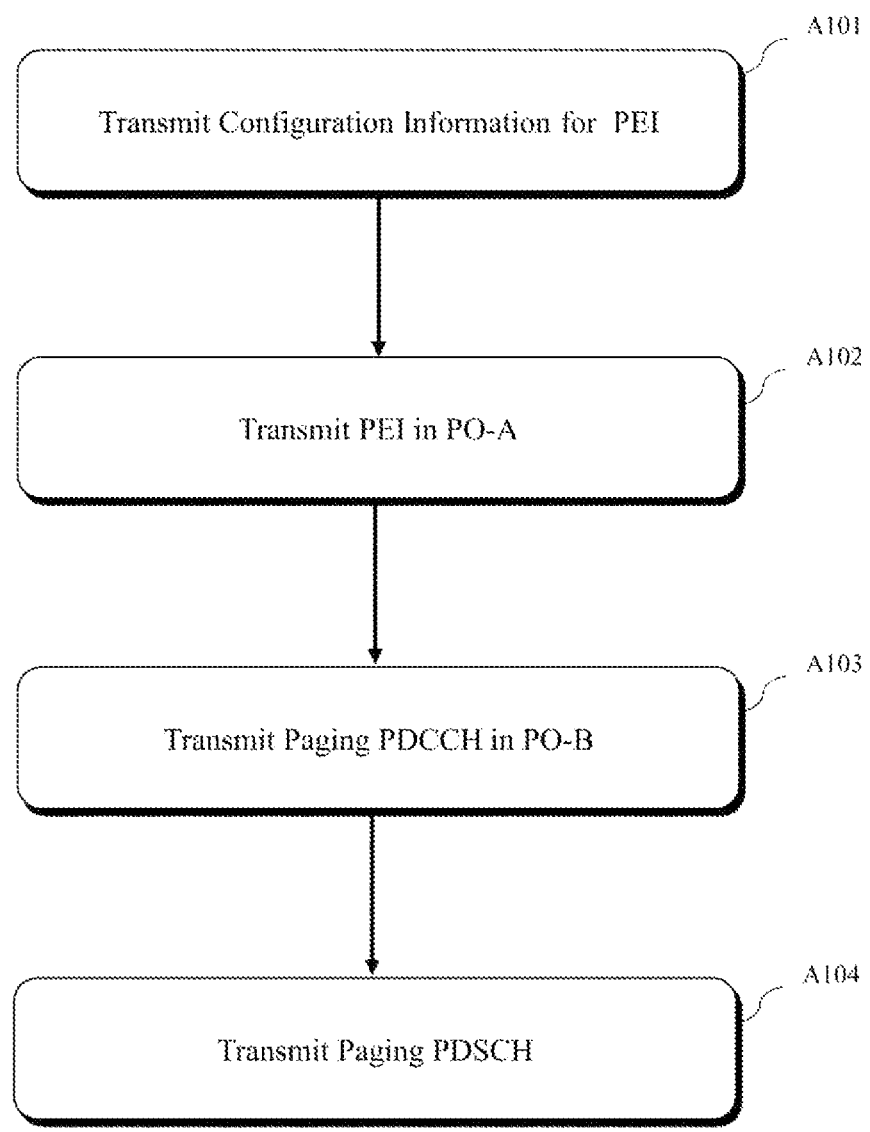
FIG. 14 illustrates a flowchart of a BS operation according to an embodiment of the present disclosure.

FIG. 14 illustrates a flowchart of a BS operation to which the proposed method is applicable.

Referring to FIG. 14, the BS may generate and transmit configuration information related to a PEI in order to support the operation proposed in the present disclosure (A101). For example, the configuration information may be transmitted using a higher layer signal (e.g., SIB or RRC signaling).

When there is paging information to be transmitted to specific UE(s), the BS may transmit the PEI in a specific PO (hereinafter referred to as PO-A) (A102). For example, the PEI may include information such as whether to wake up in another PO (hereinafter referred to as PO-B) located after the PO-A, UE sub-group indication, and/or a short message, and may be transmitted through a PDCCH or a DL signal.

Then, the BS may generate paging DCI based on the PEI and transmit the paging DCI through the PDCCH (A103).

Then, the BS may transmit the PDSCH including the paging message based on the scheduling information of the PDSCH transmitted through the PDCCH (A104). When there is no paging message to be transmitted by the BS, this operation may be omitted.

UE Operation

Figure 15:
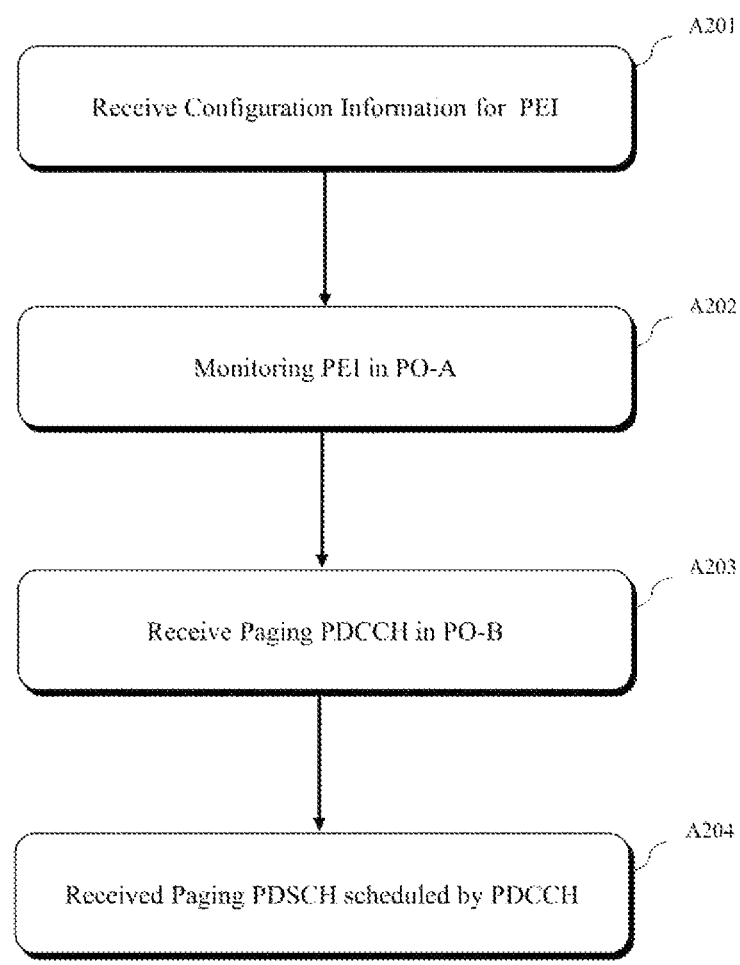
FIG. 15 illustrates a flowchart of a UE operation according to an embodiment of the present disclosure.

FIG. 15 illustrates a flowchart of a UE operation to which the proposed method is applicable.

Referring to FIG. 15, when the UE receives configuration information related to a PEI from the BS, it may be expected that the operation proposed in the present disclosure is supported (A201). For example, the configuration information may be received using a higher layer signal (e.g., SIB or RRC signaling).

The UE may monitor the PO-A based on the configuration information, and when the UE succeed in detection, the UE may attempt to detect the PEI, and when the BS transmits the PEI, the BS may receive the PEI (A202). For example, information of the PEI may include information such as whether to wake up in another PO (PO-B) located after the PO-A, UE sub-group indication, and/or a short message, and may be transmitted through a PDCCH or a DL signal.

Then, when the UE is instructed to perform an operation of the PO-B through the PEI at the location of the PO-A, the UE may monitor the PDCCH for detection of paging DCI detection at the location of the PO_B based on the received PEI, and when the BS transmits the PDCCH, the BS may receive the PDCCH (A203). When PDSCH scheduling information including a paging message is included in the PEI received by the UE, the corresponding operation may be omitted.

Then, the UE may perform PDSCH reception based on PDSCH scheduling information instructed through paging DCI and/or the PEI (A204). When the UE is instructed in the previous step that there is no PDSCH transmission for the corresponding UE, the corresponding operation may be omitted.

One or more of the following methods may be applied in combination (with at least one method described herein). Each method may be operated in an independent form without a separate combination, or one or more methods may be combined and operated in a linked form. Some terms, symbols, and orders used to describe the present disclosure may be replaced with other terms, symbols, and orders as long as the principles of the present disclosure are maintained.

Hereinafter, an example of a signal or a channel for the purpose of pre-transmitting and receiving related information prior to transmission of paging, in particular, the purpose of notifying whether or not paging is transmitted will be described to explain the principle of the present disclosure, but proposed methods are not limited to a type of a physical channel or the purpose of information transmitted therethrough unless otherwise specified. Therefore, the proposed methods may be applied to all types of physical channels and the purpose of information transmitted therethrough as long as the principle of the present disclosure is not infringed, unless otherwise described.

In addition, the PEI described later does not necessarily have to have the form of information bits such as DCI or a PDCCH, and may be implemented in the form of a pre-defined sequence (e.g., on-off keying or OOK-based frequency sequence). The term PEI may be replaced with various other terms such as a wake-up signal (WUS).

Hereinafter, an example is shown based on the NR system to explain the principle of the disclosure, but the proposed methods do not specify and limit the transmission and reception form of NR unless otherwise specified. Therefore, the proposed methods may be applied to all structures of wireless communication transmission and reception as long as the principle of the present disclosure is not infringed unless otherwise specified.

In this specification, the following terms are defined and used for convenience of explanation.

In this specification, a paging frame and a paging occasion expected by UEs that perform an existing paging procedure without performing an operation related to the PEI are defined and described as PF-L and PO-L, respectively. Similarly, the PDCCH monitoring occasion included in a PO-L is defined and described as a MO-L.

In this specification, a paging frame determined to be monitored by the UE to receive paging is defined as a PF-B, and a paging occasion is defined as a PO-B. In this case, in the case of a UE not expecting the operation of the PEI, the PF-B and the PO-B may be the same as the PF-L and the PO-L, respectively. Similarly, the PDCCH monitoring occasion included in the PO-B is defined and described as a MO-B.

In this specification, a PF and a PO monitored by the UE to receive PEI information are defined and described as a PF-A and a PO-A, respectively. Similarly, the PDCCH monitoring occasion included in the PO-A is defined and described as a MO-A.

In this specification, a group of UEs sharing a PO calculated using paging parameters configured with a UE ID and an SIB of the UE is defined and described as a UE group.

(Method A) Method of Transmitting and Receiving Information Related to Paging in PO-A For example, paging early indication (hereinafter referred to as a PEI) may include a signal or channel used for the purpose of notifying whether paging DCI or a paging message is transmitted prior to a PO or indicating whether a specific UE receives the paging DCI or the paging message. Characteristically, an example of the present disclosure proposes a method of reusing a PO to determine a location for a BS to transmit and a UE to receive the PEI.

The BS may provide PO-related parameters to the UE through transmission of the SIB. Based on the above information and the UE ID, the BS and the UE may calculate the location of a PF and a PO for transmitting and receiving paging. In this case, a group of UEs monitoring the same PO may be referred to as a UE group. When the existing paging procedure is used, if PDSCH transmission is scheduled through a specific PO, all UEs monitoring the corresponding PO need to perform an operation to receive the PDSCH.

UE Wake-Up Indication in PO-B Using PO-A

An example of the present disclosure proposes a method of using another PO (i.e., PO-A) to provide paging-related information in advance prior to a PO (i.e., PO-B) in which paging for a specific UE ID is scheduled. In the characteristically proposed method, the paging-related information may be information indicating whether or not the UE needs to wake up in the PO-B (to receive paging in the PO-B). To this end, DCI transmitted in the PO-A may include information related to a wake-up operation of the UE monitoring the PO-B.

A specific example of a UE operation when the proposed method is applied may be as follows. Prior to the PO-B repeated with the DRX cycle, the UE may determine to monitor the DCI (e.g., DCI format 1_0) scrambled with the CRC to the P-RNTI in the PO-A configured with the location associated with each PO-B. When the UE succeeds in detecting the DCI at the location of the PO-A and receives a wake-up operation (receives paging in the PO-B) from the DCI, the corresponding UE performs an operation for paging reception at the location of the associated PO-B. In this case, the operation for receiving paging may include monitoring of DCI (DCI format 1_0) scrambled with the CRC as a P-RNTI, and/or a reception operation of a scheduled PDSCH.

When the UE succeeds in detecting the DCI at the location of the PO-A and does not receive a wake-up instruction from the DCI, the corresponding UE may determine not to expect paging reception at the location of the associated PO-B. This may mean that the UE is allowed to skip a PDCCH monitoring operation for detecting the DCI or an operation for PDSCH reception at the location of the PO-B.

A specific example of a BS operation when the proposed method is applied may be as follows. Prior to transmitting paging for a specific UE(s) performing a paging operation in the PO-B, the BS may indicate a wake-up operation of the UE (receiving paging in the PO-B) through the PO-A at the location associated with the PO-B. Then, the BS may perform an operation of paging transmission at the location of the PO-B associated with the PO-A. At this time, the paging transmission operation may include PDCCH transmission delivering DCI (DCI format 1_0) scrambled with CRC as a P-RNTI, and/or transmission of PDSCH including a paging message.

In the proposed method, the UE may determine not to expect PDSCH reception in the PO-A. This may be to obtain a power saving gain by determining not to expect reception of a PDSCH to be scheduled within the same slot when the UE monitors the PDCCH in the PO-A.

The proposed method has an advantage of increasing the efficiency of resource overhead by sharing and using a PO, which is an existing resource, without configuring a separate resource for an operation of the PEI.

Inclusion of UE Sub-Grouping Information in UE Wake Up Indication

An example proposes a method of separately providing wake up information of a PO-B indicated by a PO-A for each UE sub-group. To this end, DCI transmitted in the PO-A may be determined to include information about a UE sub-group of UEs monitoring the PO-B. The proposed method may be a characteristic form in which wake up of the UE is instructed/executed in the method of 'instructing UE wake up in the PO-B using the PO-A'.

A specific example of UE operation when the proposed method is applied may be as follows. When the UE succeeds in detecting DCI (e.g., DCI format 1_0) in which the CRC is scrambled with a P-RNTI in the PO-A, and a wake-up operation for the UE sub-group corresponding to the corresponding UE is instructed in the corresponding DCI, the corresponding UE may determine to perform an operation for receiving paging at the location of the associated PO-B. At this time, the operation for receiving the paging may include monitoring of DCI (DCI format 1_0) scrambled with CRC by the P-RNTI and/or a reception operation of a scheduled PDSCH.

When the UE succeeds in detecting the DCI at the location of the PO-A and is not instruct to perform the wake-up operation for the UE sub-group corresponding to the corresponding UE from the DCI, the corresponding UE may determine not to expect paging reception at the location of the associated PO-B. This may mean that the UE is allowed to skip a PDCCH monitoring operation for detecting DCI or an operation for PDSCH reception at the location of the PO-B.

A specific example of a BS operation when the proposed method is applied may be as follows. Prior to transmitting paging for a specific UE(s) performing a paging operation in the PO-B, the BS may indicate a wake-up operation for a UE sub-group to which the corresponding UE belongs through a PO-A associated with the PO-B (paging reception in the PO-B). Then, the BS may perform an operation of paging transmission for the indicated UE sub-groups at the location of the PO-B associated with the PO-A. At this time, the paging transmission operation may include PDCCH transmission delivering DCI (DCI format 1_0) scrambled with CRC as a P-RNTI, and/or transmission of a PDSCH including a paging message.

The UE sub-group of the specific UE may be determined using unique information of the UE and specific parameter(s). At this time, the unique information of the UE may be the UE ID of the UE, may be information determined by the capability or request of the UE, and/or may be information designated by the BS (or higher node). In this case, the specific parameter(s) may be predetermined by the standard or may be a value configured by the BS through the SIB. The specific parameter may include the number of UE sub-groups.

The proposed method has an advantage of increasing power saving efficiency of the UE by reducing unnecessary wake-up caused by paging of other UEs through sub-grouping of the UE.

Inclusion of Short Message Information in UE Wake-Up Indication

For example, when the UE detects DCI in the PO-A, the UE may determine to expect information of a short message in the PO-A. The DCI (e.g., DCI format 1_0) in which the CRC is scrambled with a P-RNTI defined in the current (Rel-16 standard) NR may include the information of the short message to be acquired without receiving the PDSCH scheduled by the corresponding DCI. The information of the short message includes information of system information modification and information of ETWS/CMAS notification. Such information may generally be valid information for all UEs expecting paging from the corresponding BS, and a necessary operation of the UE may be indicated only by transmitting and receiving the PDCCH.

A specific example of a UE operation when the proposed method is applied may be as follows. When the UE succeeds in detecting DCI (DCI format 1_0) in which the CRC is scrambled with a P-RNT in the PO-A, and the corresponding DCI includes the information of the short message, the UE may perform an associated operation (e.g., an operation for updating SIB information or obtaining ETWS/CMAS information) pre-promised based on information specified in the short message.

When the proposed method is used, even if a go-to-sleep operation (which does not expect paging in the PO-B) is indicated in the PO-A, the UE may obtain a short message without any additional operation, thereby advantageously obtaining a power saving gain.

Inclusion of Information (e.g., Location of PO-B) of UE Group in UE Wake-Up Indication A structure in which a plurality of PO-Bs correspond to one PO-A may be used. For example, when the SSB is transmitted in a period of t_ssb ms and N POs are included in the period of t_ssb ms, each of the N POs may be used as a location of a PO-B for N UE groups, and thereamong, one PO (PO in the earliest order within the period of t_ssb ms) at a specific location may us a method of determining to perform a function of the PO-A. At this time, the PO-A may include information of the PO-B as a target of wake-up.

A specific example of a UE operation when the proposed method is applied may be as follows. When the UE succeeds in detecting DCI (e.g., DCI format 1_0) in which CRC is scrambled with a P-RNTI in the PO-A, if the UE is instructed to perform a wake-up operation at the location of the PO-B corresponding to a UE group (or UE ID) to which the UE belongs from the corresponding DCI, the UE may determine to expect paging reception at the location of the PO-B to be monitored by the UE. At this time, the operation for receiving the paging may include monitoring of DCI (e.g., DCI format 1_0) scrambled with CRC as a P-RNTI, and/or an operation of receiving a scheduled PDSCH.

When the UE succeeds in detecting the DCI at the location of the PO-A and does not receive a wake-up operation for the UE sub-group corresponding to the corresponding UE from the DCI, the corresponding UE may determine not to expect paging reception at the location of the associated PO-B. This may mean that the UE is allowed to skip a PDCCH monitoring operation for detecting DCI or an operation for PDSCH reception at the location of the PO-B.

A specific example of a BS operation when the proposed method is applied may be as follows. Prior to transmitting paging for a specific UE(s) performing a paging operation in a specific PO-B, the BS may indicate a wake-up operation for a UE sub-group to which the corresponding UE belongs through a PO-A associated with the PO-B (paging reception in the specific PO-B). Then, the BS may perform an operation of paging transmission for the indicated UE group at the location of the PO-B indicated by the PO-A. At this time, the paging transmission operation may include PDCCH transmission delivering DCI (e.g., DCI format 1_0) scrambled with CRC as a P-RNTI, and/or transmission of a PDSCH including a paging message.

The proposed method may be used in combination with the above-described proposal using information about UE sub-grouping. For example, the UE may determine to expect paging reception at the location of the associated PO-B only when the UE receives a wake-up instruction corresponding to a UE group (or UE ID) of the UE at the location of the PO-A and a wake-up instruction for the UE sub-group.

Operation when UE does not Detect DCI in PO-A

An operation method of the UE performed when the UE does not detect DCI in the PO-A may be defined. When the UE does not detect the DCI in the PO-A, two situations may exist. (1) In one case, the BS transmits a PDCCH through the PO-A, but the UE does not detect the PDCCH. (2) In another case, the BS does not actually transmit the PDCCH in the PO-A. Considering these cases, the following Alt-1-1, Alt-1-2, or Alt-1-3 may be considered as a UE operation when the UE does not detect DCI in the PO-A.

(Alt-1-1) When the UE does not detect the DCI in the PO-A, a method of determining that the UE does not expect paging reception in the PO-B may be used. In this case, the BS may not perform PDCCH transmission in the PO-A when there is no paging in the PO-B for the UE performing a PEI operation in the PO-A. When this method is used, the BS may perform a go-to-sleep operation of the UE (does not perform paging in the PO-B) without a separate indication process, and thus DL resource overhead may be advantageously saved when there is no traffic. In particular, the proposed method may obtain an advantageous effect as the expected paging traffic of the UE is lowered.

(Alt-1-2) When the UE does not detect DCI in the PO-A, a method of determining that the UE expects paging reception in the PO-B may be used. In this case, the BS may instruct the go-to-sleep operation of the UE (does not perform paging in PO-B) through DCI transmission in the PO-A. When this method is used, the probability that the UE misses an indication for paging may be advantageously lowered relatively.

(Alt-1-3) A method in which the BS designates an operation to be performed by the UE when the UE does not detect DCI in the PO-A may be used. In this case, the BS may indicate whether to perform a wake up or go-to-sleep operation at the location of the PO-B when the UE does not detect the DCI in the PO-A. For example, the BS may perform indication through the SIB. And/or, the BS may determine to indicate the operation through dedicated RRC signaling in consideration of the characteristics of the UE, and to this end, this may include a method in which the UE reports or negotiates the characteristics or capabilities thereof to the BS (or higher node). When this method is used, the BS (or higher node) may indicate a UE operation in consideration of the traffic characteristics of a cell or the characteristics of the UEs expected to transmit and receive paging, and therethrough, DL resource overhead of the BS and power saving efficiency of the UE may be advantageously controlled.

Figure 16:
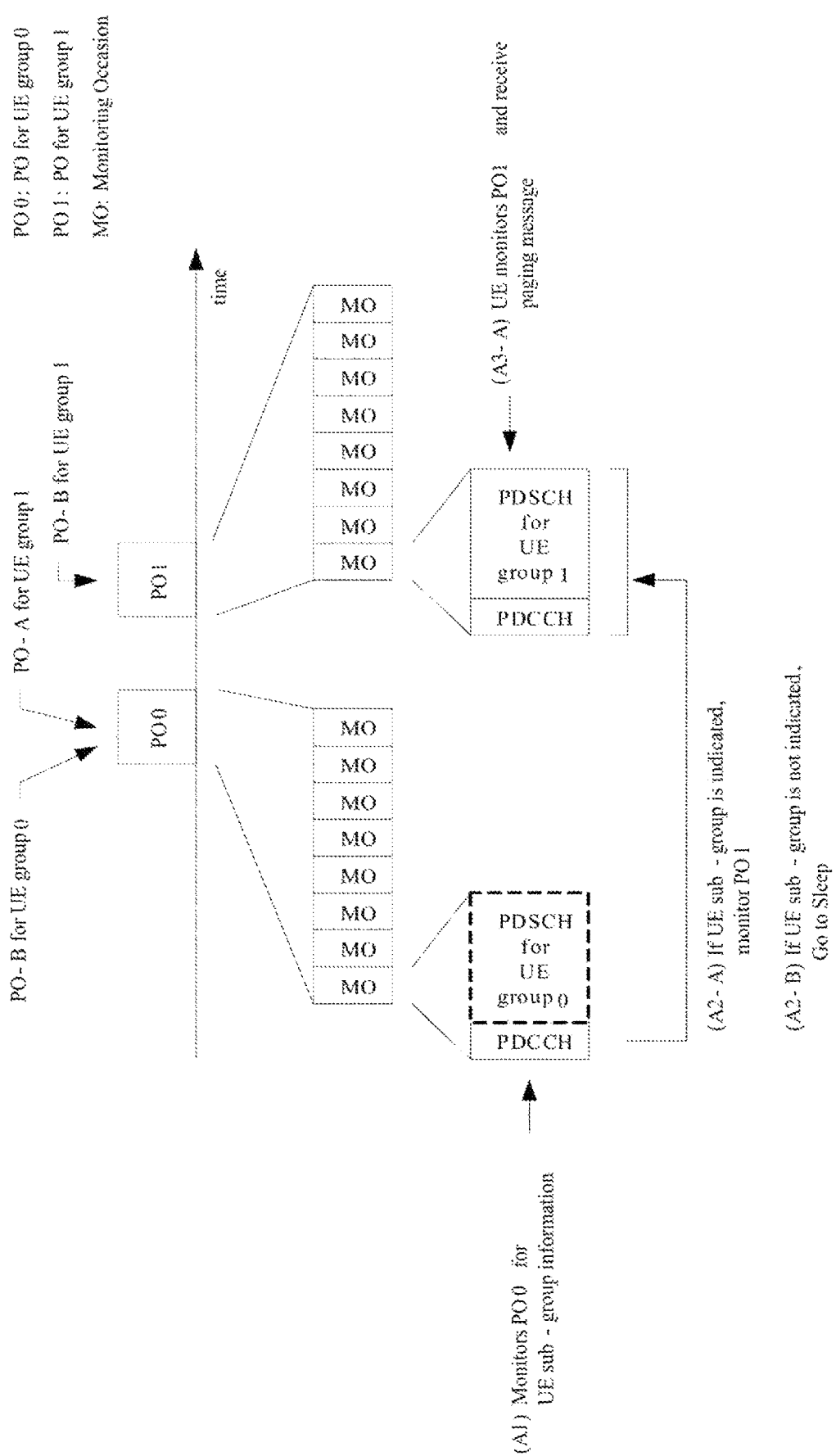
FIGS. 16 to 18 are diagrams for explaining a procedure of transmitting and receiving a PEI and paging according to an embodiment of the present disclosure.

FIG. 16 illustrates an example of a process in which Method A is applied and the UE determines whether to monitor a PO-B based on a UE sub-group in a PO-A. In the example of FIG. 16, a UE expecting reception of paging in a PO1 (UE group 1 in the example of FIG. 16) expects an operation of the PEI in a PO0 and monitors the same (Operation A1 in FIG. 16). In this case, for a UE belonging to UE group 1, the PO1 corresponds to the PO-B proposed in Method A, and the PO0 corresponds to the PO-A proposed in Method A. When the UE is instructed to wake up for the UE sub-group to which the UE belongs in the PO-A (Operation A2-A in FIG. 16), the UE performs an operation for receiving paging at the location of the PO-B (Operation A3-A in FIG. 16). When the UE is not instructed to wake up for the UE sub-group to which the UE belongs in the PO-A, the UE may skip the PO-B without monitoring (Operation A2-B in FIG. 16). The example of FIG. 16 is only an example of an operation to which Method A is applied, and the proposed method is not limited to this example.

The example of FIG. 16 shows an example in which MOs at specific locations among MOs constituting PO0 and PO1 operate as a pair for convenience of description, but application of Method A is not limited to MOs at the specific locations. More specifically, similarly to the previously defined paging operation of NR, a rule may be determined for the UE to assume that all MOs constituting the PO-A include the same PEI, and the UE may assume that all MOs constituting the PO-B include the same paging information.

The method proposed in Method A may be expressed in a form in which the UE determines PO(s) and determines information expected from the corresponding PO(s). As an example, the proposed method may be expressed in a form in which the UE expresses determination of the location of the PO-A based on the TS38.304 document of the NR standard, and information obtained in the PO-A is limited and expressed as a PEI (e.g., wake-up indication, UE sub-group indication, and index of the PO-B) and/or information of a short message information). In addition, based on the standard document, the UE may express determination of the location of the PO-B and may determine information acquired in the PO-B to be the same as the existing paging procedure.

(Method B) Method of Determining Locations of PO-A and PO-B

The BS and the UE may need to equally know the locations of the PO-A and the PO-B. An example of the present disclosure proposes a method of determining the locations of the PO-A and the PO-B.

Method of Using PO-L for Purpose of PO-B

An embodiment of the present disclosure proposes a method of using the locations of the PO-L for the purpose of PO-B, as in method B-1. This means that, regardless of whether a PEI is supported or actually applied, the UE always determines the location of the PO-L based on a UE ID thereof and parameters configured through the SIB, and expects paging reception at the location of the PO-L.

Method of Using Nearest PO as PO-A Before PO-B

An example of the present disclosure proposes a method of determining the location of the PO-A relative to the PO-B. Specifically, the location of the PO-A may be determined as a PO closest to a PO-B (hereinafter referred to as PO-A1) among POs located ahead of the PO-B. At this time, the PO-A1 may be a PO used by another UE group to receive paging. The proposed method may be to minimize an effect of paging latency that may increase due to a PEI operation by minimizing an interval between the PO-A and the PO-B.

A specific example of a UE operation when the proposed method is applied may be as follows. The UE may calculate the locations of the PO-A and the PO-B based on a UE ID thereof and paging-related parameters received from the BS. Based on the calculated information, the UE may expect PEI information at the location of the PO-A, and when wake up information for the corresponding UE is checked, paging reception may be expected in the PO-B.

A specific example of a BS operation when the proposed method is applied may be as follows. The BS may inform UEs of paging-related parameters through an SIB. When paging transmission for a specific UE is required, the BS may calculate the locations of the PO-A and the PO-B based on the paging-related parameters and obtain PEI information at the location of the PO-A (wake-up indication for the PO-B at the associated location) and perform paging transmission in the PO-B.

Figure 17:
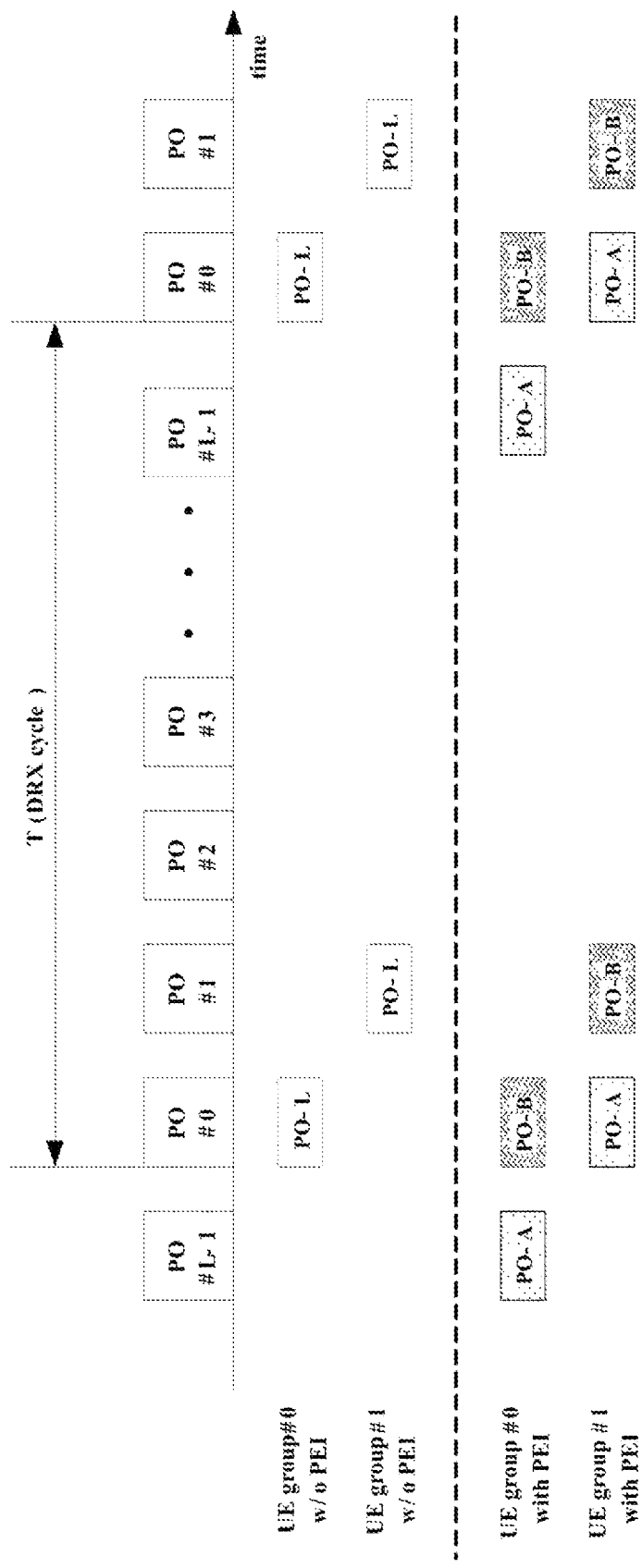

FIG. 17 shows an example in which a PO-A and a PO-B are determined when the proposed method is used. Referring to FIG. 17, when a UE performing a PEI operation belongs to a UE group (UE group #1) that monitors PO #1 based on a legacy UE, the corresponding UE determines PO #1 as the PO-B and operates, and the UE determines PO #0, which is the closest PO among the POs configured before PO #1, as the PO-A and operates. The example of FIG. 17 is only an example to which the present disclosure is applied, and the proposed method is not limited thereto.

Method of Using Closest PO Before PO-B as PO-A (Additional Method to Consider Location of Adjacent SSB)

As proposed above, when determining the location of the PO-A as a PO closest to the PO-B among the POs located ahead of the PO-B (hereinafter referred to as PO-A1), the location of an adjacent SSB may be additionally considered. Power efficiency of a UE performing a paging procedure in NR may vary depending on an interval between a SSB and a PO. This is because power consumption occurs as the UE maintains light (or micro) sleep while waiting for the location of a designated PO after performing SSB monitoring for T/F tracking. Therefore, when the location of the PO-A is closer to the SSB than the location of the PO-B, it may be seen that power efficiency increases when the UE is not paged. However, when the location of the PO-B is the first PO that appears after a specific SSB, the location of the PO-A1 corresponding to the corresponding PO-B is the location preceding the specific SSB, which increases a gap of the SSB-to-PO. In order to resolve this problem, an example of the present disclosure proposes the following two additional technologies.

Figure 18:
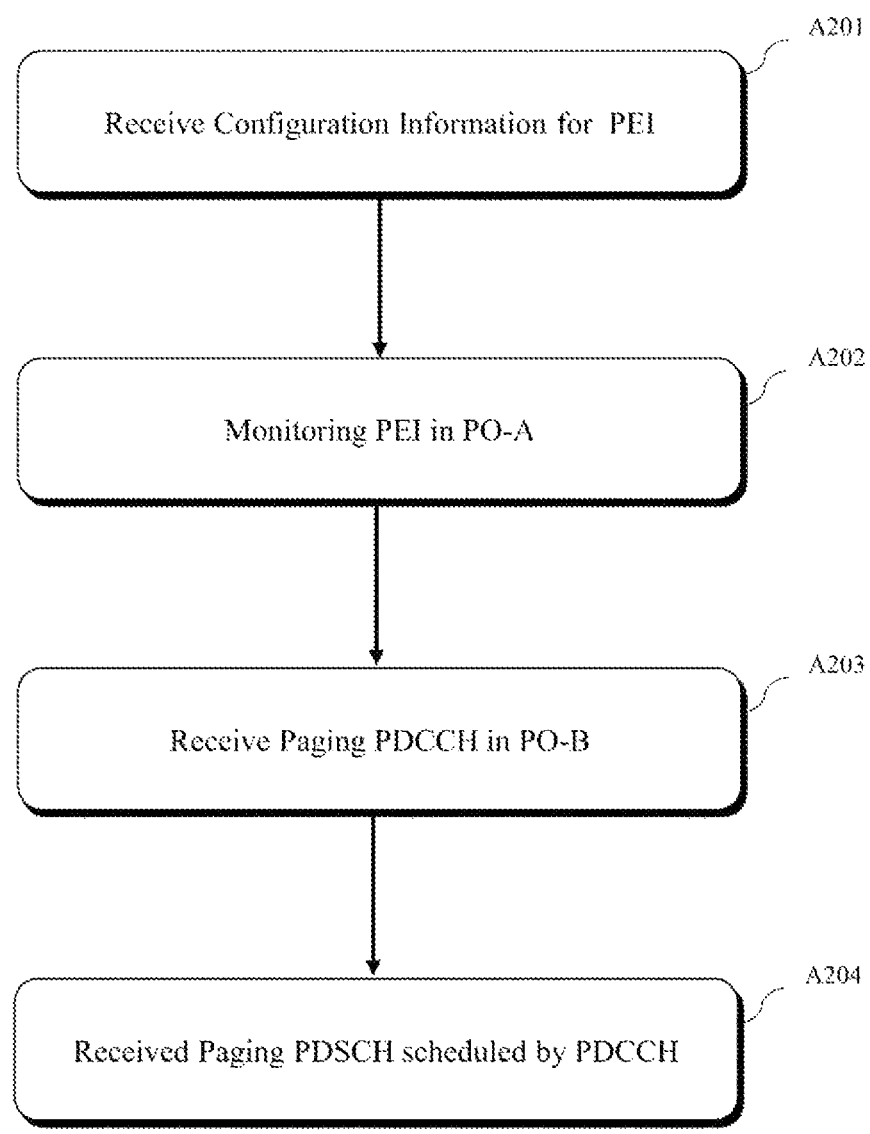

(Alt-2-1) If the SSB is located between the PO-A1 and the PO-B, a method of determining that the corresponding UE does not perform a PEI function may be used. In a more specific method, in the case of a UE corresponding to the above condition, the PO-A is not monitored (i.e., PO-A is not configured) and the PO-B is directly monitored to perform the paging procedure. At this time, since the corresponding UE performs the same paging procedure as the existing UE that does not expect the PEI operation, the PO-B has the same function as the PO-L. Alternatively, in the case of a UE that satisfies the above condition, a method of determining to immediately expect an indication of a UE sub-group at the PO-L location may be considered. This may be to enable UEs configured in the corresponding PO to obtain a power saving gain through UE sub-grouping. In the example of FIG. 18, since the SSB exists between the location corresponding to the PO-B and the PO-A1, UE group 0 may perform a paging procedure in PO #0 without expecting the PO-A according to the proposed method.

A specific example of a UE operation when the proposed method is applied may be as follows. The UE may calculate the location of the PO-B based on a UE ID of the UE and paging-related parameters received from the BS. At this time, when SSB transmission is scheduled between the calculated position of the PO-B and the PO-A1 on a time axis, the UE may omit an operation in the PO-A and directly monitor the PO-B. When the above conditions are not satisfied, the UE may configure the location of the PO-A1 as the PO-A and expect to receive the PEI at this location.

A specific example of a BS operation when the proposed method is applied may be as follows. The BS may inform UEs of paging-related parameters through an SIB. When paging transmission for a specific UE is required and SSB transmission is scheduled between the PO-A1 and the location of PO-B assigned to the UE, the BS may omit PEI transmission and transmit paging-related information in the PO-B. When the above condition is not satisfied, the BS may transmit the PEI at the location of the PO-A1 of the corresponding UE and perform paging transmission at the location of the related PO-B.

(Alt-2-2) When the SSB is located between the PO-A1 and the PO-B, the UE corresponding thereto may use a method of determining to perform a PEI operation at a separately configured location (hereinafter referred to as PEIOB) between the SSB and the PO-B instead of the location of the PO-A1. More specifically, in the case of a UE corresponding to the above condition, instead of configuring the PO-A based on the PO-A1, an operation on the PO-A may be determined to be performed in the PEIOB according to a predetermined rule. At this time, according to the predetermined rule, when the location of the PEIOB is determined, the location may be determined between the SSB and the PO-B at the closest location on a time axis, and a method of determining the location relative to the PO-B (or SSB) may be considered. At this time, a function provided in the PEIOB may include all or part of functions provided by the PO-A (e.g., wake up indication, UE sub-group indication, and/or short message). This may be to maintain power saving gain by reducing a gap of SSB-to-PEI while ensuring a gain of the PEI to UEs configured in the corresponding PO. In the example of FIG. 18, UE group 0 may perform the function of the PO-A in the PEIOB without expecting the PO-A according to the proposed method because the SSB exists between the location corresponding to the PO-B and the PO-A1.

A specific example of a UE operation when the proposed method is applied may be as follows. The UE may calculate the location of the PO-B based on a UE ID of the UE and paging-related parameters received from the BS. At this time, when SSB transmission is scheduled between the calculated location of the PO-B and the PO-A1 on a time axis, the UE may expect to receive the PEI at the location of the PEIOB configured between the corresponding PO-B and the nearest SSB. When the above conditions are not satisfied, the UE may determine the location of the PO-A1 as the PO-A and expect to receive the PEI at this location.

A specific example of a BS operation when the proposed method is applied may be as follows. The BS may inform UEs of paging-related parameters through an SIB. When paging transmission for a specific UE is required and SSB transmission is scheduled between the PO-A1 and the location of the PO-B assigned to the corresponding UE, the BS may transmit the PEI at the location of the PEIOB configured between the corresponding PO-B and the nearest SSB and paging-related information in the PO-B. If the above condition is not satisfied, the BS may transmit the PEI at the location of the PO-A1 of the corresponding UE and perform paging transmission at the location of the related PO-B.

(Method C) DCI Transmitted and Received in PO-A

As an example, a method of providing information to a UE by a BS by transmitting and receiving DCI at a location of a PO-A (or PEIOB) may be considered. To this end, Method C proposes a design method of DCI transmitted and received at the location of the PO-A (or PEIOB). In the following description, for convenience, the proposed method is described based on the PO-A, but even if there is no separate explanation, the same DCI design method may be applied to the location of the PEIOB in which the same function as the PO-A is performed.

DCI Design Scheme Based on DCI (e.g., DCI Format 1_0) Having CRC Scrambled with P-RNTI For example, DCI transmitted and received in the PO-A may be DCI having CRC scrambled with a P-RNTI (e.g., DCI format 1_0). At this time, the DCI (e.g., DCI format 1_0) in which the CRC is scrambled with the P-RNTI may be a DCI format used for the purpose of existing paging (i.e., used in NR Rel-15/16), and the BS and the UE may be determine to transmit and receive DCI format 1_0 through the PO. For example, as described above, the location of the PO-L of another UE may be used to determine the PO-A of a specific UE. At this time, the location of the corresponding PO may be shared by a UE expecting the PEI and a UE that does not, which means that a PO-A for a specific UE is used as the location of a PO-B or a PO-L for other UEs. Therefore, a method for ensuring paging transmission and reception for the existing UE and other PEI capable UEs may be required.

As a detailed method, the existing reserved available bits (8 bits for operation in a cell with shared spectrum channel access; otherwise 6 bits) (i.e. used in NR Rel-15/16) may be used to express the PEI among DCI bits constituting the DCI (e.g., DCI format 1_0) in which the CRC is scrambled with the P-RNTI. Information proposed in Method A may be expressed in the PEI. For example, the information may include whether or not the PO-B wakes up, an indication of a UE sub-group, and/or an index of the PO-B indicated. At this time, since the information of the short message proposed in Method A is expressed by the DCI field constituting the DCI (e.g., DCI format 1_0) in which the CRC is scrambled with the existing P-RNTI, the information of the short message may be determined not to be added to the reserved bits.

Characteristically, the proposed method may be determined such that the UE expects the same information regardless of a short message indicator. Specifically, in all cases in which 'Only short message', 'Only scheduling information for Paging', or 'Both scheduling information for Paging and short message' is indicated by the short message indicator, it may mean that fields indicating the PEI are to be used for the same purpose. This may be an advantageous structure for stably providing the PEI regardless of the type and content of information that the BS intends to provide to the UE expecting the operation of the PO-B or the PO-L at the location of the PO-A.

A specific example of a UE operation when the proposed method is applied may be as follows. The UE may expect reception of DCI (e.g., DCI format 1_0) in which the CRC is scrambled with the P-RNTI at the location of the PO-A and perform blind decoding (BD) thereon. When the UE succeeds in the BD, the UE may acquire information on a bit field representing PEI-related information regardless of information represented by other DCI fields and use the information. In addition, when the BD succeeds and the short message indicator of the detected DCI indicates that a short message is included (i.e., 'Only short message' or 'Both scheduling information for Paging and short message'), the UE may check and use information of the short information through the short message field.

A specific example of a BS operation when the proposed method is applied may be as follows. The BS may transmit DCI (e.g., DCI format 1_0) in which the CRC is scrambled with the P-RNTI at the location of a specific PO. At this time, when the PO is used for a UE expecting the purpose of the PO-A, the BS may include and transmit the PEI in the location of bits determined for the purpose of the PEI in the DCI. In addition, when the location of the specific PO is used for a UE expecting the purpose of the PO-B or the PO-L, the BS may transmit paging information (e.g., short message and/or PDSCH scheduling information) to the DCI. At this time, operations for the above two purposes may be performed simultaneously. This means that a specific PO is used simultaneously for the purpose of the PO-A, the PO-B and/or the PO-L. At this time, this means that the BS expresses information for UEs expecting the purpose in one same DCI and transmits the information.

Table 6 shows an example of the configuration of DCI (e.g., DCI format 1_0) in which the CRC is scrambled with the P-RNTI when the proposed method is applied. In the example of Table 6, 4 bits for representing UE sub-grouping may correspond to the PEI. The example of Table 6 is only one example for illustrative purposes, and the application of the method proposed in the present disclosure is not limited thereto.

Method of Providing PDSCH Scheduling Information of PO-B in PO-A

An example proposes a method in which paging scheduling information (i.e., PDSCH scheduling information through which a paging message is transmitted) is provided together when a PEI is provided in the PO-A. A power saving gain to be expected by the UE performing a PEI operation may occur by preparing for PDSCH decoding and omitting PDSCH decoding by not expect PDSCH reception at the location of the PO-A basically, and when an additional function such as UE sub-grouping is used, an additional power saving gain may be expected. However, when transmission of an actual PDSCH is scheduled, the UE may have a disadvantage in that power consumption due to BD in the PO-A and power consumption due to BD in the PO-B may overlap. In order to prevent this, an example of the present disclosure proposes a method for the UE to omit PDCCH BD in the PO-B through a method of including PDSCH scheduling information for the PO-B in the PO-A in the PEI.

Specifically, when the UE confirms PDSCH scheduling information in the PO-A, the information may be determined to be applied as PDSCH scheduling information for the PO-B. In this case, the UE may determine not to expect that the PDSCH scheduling information is to be applied to the PO-A. This is advantageous in that the UE obtains a power saving gain by not expecting PDSCH scheduling in the PO-A, and at the same time, when PDSCH scheduling information is acquired, it may be advantageous to increase a power saving gain by not performing additional BD at the location of the PO-B.

When the proposed method is applied, one PO may be used simultaneously for the purposes of the PO-A and the PO-B or the PO-L. In particular, for a UE that uses a specific PO for the purpose of the PO-B or the PO-L, scheduling of a PDSCH including a paging message may be ensured in the corresponding PO. In order to provide PDSCH scheduling for a UE that uses a specific PO for the purpose of the PO-A and a UE that uses the specific PO for the purpose of the PO-B or the PO_L, the method proposed by the present disclosure may include the following additional methods.

(Alt-3-1) Specifically, when a short message indicator is included in the DCI format transmitted and received through the PO-A, whether to apply the proposed method may be determined according to the state of the short message indicator. More specifically, when the short message indicator of the DCI transmitted in the PO-A expresses 'Reserved' or 'Only short message', the UE may determine to expect PDSCH scheduling information for the PO-B in

TABLE 6

The following information is transmitted by means of the DCI format 1_0 with CRC scrambled by P-RNTI:
- Short Messages Indicator - 2 bits according to Table 7.3.1.2.1-1.
- Short Messages - 8 bits, according to Clause 6.5 of [9, TS38.331]. If only the scheduling information for Paging is carried, this bit field is reserved.
- Frequency domain resource assignment - $\lceil \log_2 ( N_{RB}^{DL,BWP} ( N_{RB}^{DL,BWP} + 1 ) / 2 ) \rceil$ bits. If only the short message is carried, this bit field is reserved.
    - $N_{RB}^{DL,BWP}$ is the size of CORESET 0
- Time domain resource assignment - 4 bits as defined in Clause 5.1.2.1 of [6, TS38.214]. If only the short message is carried, this bit field is reserved.
- VRB-to-PRB mapping - 1 bit according to Table 7.3.1.2.2-5. If only the short message is carried, this bit field is reserved.
- Modulation and coding scheme - 5 bits as defined in Clause 5.1.3 of [6, TS38.214], using Table 5.1.3.1-1. If only the short message is carried, this bit field is reserved.
- TB scaling - 2 bits as defined in Clause 5.1.3.2 of [6, TS38,214]. If only the short message is carried, this bit field is reserved.
- UE sub-grouping - 4 bits
- Reserved bits - 4 bits for operation in a cell with shared spectrum channel access; otherwise 2 bits the corresponding DCI and determine not to except scheduling for the PO-B for the expression of the short message indicator except for the PDSCH scheduling information. This may be to ensure PDSCH scheduling for UEs that use the location of the PO-A for the purpose of the PO-B or the PO-L when the PDSCH scheduling is required, and otherwise, may be to utilize the PDSCH scheduling because UEs expecting the purpose of the PO-B or the PO-L consider DCI bit fields used for PDSCH scheduling as a reserved state.

(Alt-3-2) Specifically, the DCI format transmitted in the PO-A may be determined to include separate indicator information indicating whether PDSCH scheduling information for the related PO-B is included. For example, when the proposed method is applied to DCI (e.g., DCI format 1_0) in which the CRC is scrambled with the existing P-RNTI, the indicator information is included in a part of the PEI and determined by using one of the reserved bits of the existing DCI format 1_0. This may be to increase the scheduling flexibility of the BS by allowing provision of PDSCH scheduling information for both the UE operating in a specific PO as the PO-A and the UE operating in the PO-B or the PO-L instead of consuming reserved bit resources of DCI.

A specific example of a UE operation when the proposed method is applied may be as follows. The UE expects to receive the DCI (e.g., DCI format 1_0) having CRC scrambled with the P-RNTI at the location of the PO-A, and when decoding is successful, the UE determines whether the corresponding DCI contains scheduling information for the PO-B. When the corresponding UE is instructed to wake up for the PO-B and obtains scheduling information for an available PO-B, the UE may determine to expect PDSCH reception according to the information obtained at the location of the PO-B.

A specific example of a BS operation when the proposed method is applied may be as follows. When the BS intends to transmit a paging message for a specific UE supporting a PEI operation, and the location of the PO-A may provide PDSCH scheduling information for the PO-B, the BS may transmit DCI (e.g., DCI format 1_0) having CRC scrambled with the P-RNTI including PDSCH scheduling information for the PO-B in the PO-A. Then, the BS may configure and transmit a PDSCH based on the transmitted PDSCH scheduling information at the location of the associated PO-B.

Classification Method Using New P-RNTI

An example proposes a method of identifying a UE as a reception target by utilizing an RNTI used for scrambling of CRC in transmission of DCI transmitted and received in the PO-A. Specifically, a method of selecting a P-RNTI used in the existing (i.e., NR Rel-15/16) and a new P-RNTI (hereinafter referred to as N-P-RNTI) according to the purpose is proposed. When the proposed methods are used, in a situation in which a specific PO is shared for the purpose of the PO-A and the purpose of PO-L, transmission of a PEI for the UE using the PO for the purpose of the PO-A is required, while there may be a case in which paging for UEs that use the same PO for the purpose of the PO-L is not required. In this case, when UEs with different purposes expect reception of the same DCI format at the location of the PO, there is a possibility that UEs expecting the purpose of the PO-L receive unnecessary information. To prevent this, an example of the present disclosure proposes a method of determining an RNTI to be applied according to the characteristics of UE(s) targeted by information transmitted in a specific PO.

Specifically, the UE may determine to expect two types of CRC scrambling to be applied to DCI format 1_0 at the location of the PO-A as a P-RNTI and an N-P-RNTI. At this time, when the UE detects DCI (e.g., DCI format 1_0) having CRC scrambled with a P-RNTI at the location of the PO-A, it may be assumed that the UE shares the corresponding DCI with UEs that use the corresponding PO for the purpose of the PO-L, and conversely, when the UE detects DCI (e.g., DCI format 1_0) having CRC scrambled with the N-P-RNTI, it may be assumed that the UE does not share the corresponding DCI with UEs that use corresponding DCI for the purpose of the PO-L. When the proposed method is used, if when the BS intends to transmit the PEI at the location of a specific PO, an unnecessary operation of existing UEs may be prevented by selecting an N-P-RNTI when it is not necessary to provide paging information for the existing information in the corresponding PO. In the opposite case, the BS intends to provides paging information for existing UEs while transmitting the PEI at the location of the specific PO, the BS may advantageously obtain the paging information and the PEI for the two purposes by selecting the P-RNTI.

A specific example of a UE operation when the proposed method is applied may be as follows. The UE may expect reception of DCI (e.g., DCI format 1_0) having CRC scrambled with a P-RNTI or an N-P-RNTI at the location of the PO-A and perform BD. (When DCI field interpretation according to the detected RNTI is different), the UE may determine to follow the DCI field interpretation suitable for the detected RNTI.

A specific example of a BS operation when the proposed method is applied may be as follows. When it is necessary to provide paging information for exiting UE(s) in the specific PO, the BS may determine to transmit DCI (e.g., DCI format 1_0) having CRC scrambled with the P-RNTI in the corresponding PO. When it is necessary to provide the PEI for specific UE(s) in the specific PO but it is not necessary to transmit paging information to other UE(s), the BS may transmit DCI (e.g., DCI format 1_0) having CRC scrambled with the N-P-RNTI. Such an operation of the BS is performed according to selection of the BS, and may not necessarily be performed.

Various descriptions, functions, procedures, proposals, methods, and/or operation flowcharts of the present disclosure may be applied to, but not limited to, various fields requiring wireless communication/connection (e.g., 5G) between devices.

Specific examples will be described in detail with reference to the drawings. In the following drawings/descriptions, the same reference numerals may denote the same or corresponding hardware blocks, software blocks, or functional blocks, unless otherwise indicated.

Figure 19:
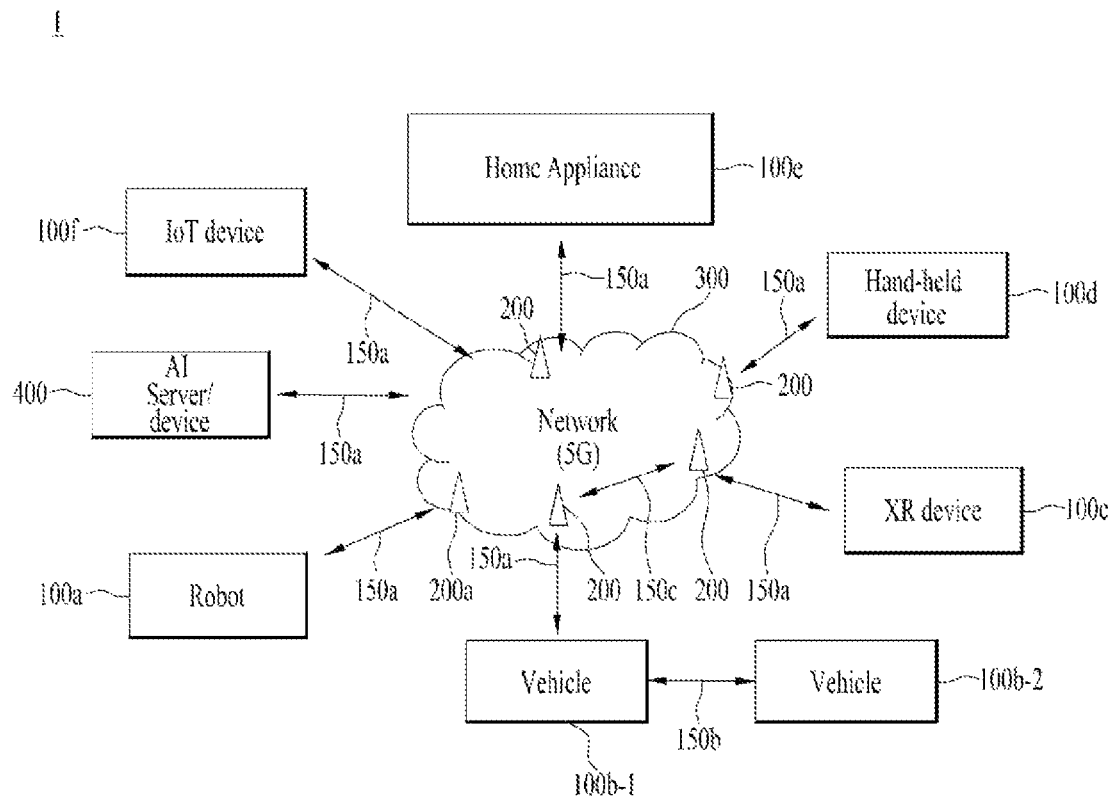
FIGS. 19 to 22 illustrate an example of a communication system 1 and wireless devices applicable to the present disclosure.

FIG. 19 illustrates a communication system 1 applied to the present disclosure.

Referring to FIG. 19, a communication system 1 applied to the present disclosure includes wireless devices, Base Stations (BS s), and a network. Herein, the wireless devices represent devices performing communication using Radio Access Technology (RAT) (e.g., 5G New RAT (NR)) or Long-Term Evolution (LTE)) and may be referred to as communication/radio/5G devices. The wireless devices may include, without being limited to, a robot 100a, vehicles 100b-1 and 100b-2, an eXtended Reality (XR) device 100c, a hand-held device 100d, a home appliance 100e, an Internet of Things (IoT) device 100f, and an Artificial Intelligence (AI) device/server 400. For example, the vehicles may include a vehicle having a wireless communication function, an autonomous driving vehicle, and a vehicle capable of performing communication between vehicles. Herein, the vehicles may include an Unmanned Aerial Vehicle (UAV) (e.g., a drone). The XR device may include an Augmented Reality (AR)/Virtual Reality (VR)/Mixed Reality (MR) device and may be implemented in the form of a Head-Mounted Device (HMD), a Head-Up Display (HUD) mounted in a vehicle, a television, a smartphone, a computer, a wearable device, a home appliance device, a digital signage, a vehicle, a robot, etc. The hand-held device may include a smartphone, a smartpad, a wearable device (e.g., a smartwatch or a smartglasses), and a computer (e.g., a notebook). The home appliance may include a TV, a refrigerator, and a washing machine. The IoT device may include a sensor and a smartmeter. For example, the BSs and the network may be implemented as wireless devices and a specific wireless device 200a may operate as a BS/network node with respect to other wireless devices.

The wireless devices 100a to 100f may be connected to the network 300 via the BSs 200. An AI technology may be applied to the wireless devices 100a to 100f and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without passing through the BSs/network. For example, the vehicles 100b-1 and 100b-2 may perform direct communication (e.g. Vehicle-to-Vehicle (V2V)/Vehicle-to-everything (V2X) communication). The IoT device (e.g., a sensor) may perform direct communication with other IoT devices (e.g., sensors) or other wireless devices 100a to 100f.

Wireless communication/connections 150a, 150b, or 150c may be established between the wireless devices 100a to 100f/BS 200, or BS 200/BS 200. Herein, the wireless communication/connections may be established through various RATs (e.g., 5G NR) such as uplink/downlink communication 150a, sidelink communication 150b (or, D2D communication), or inter BS communication (e.g. relay, Integrated Access Backhaul (IAB)). The wireless devices and the BSs/the wireless devices may transmit/receive radio signals to/from each other through the wireless communication/connections 150a and 150b. For example, the wireless communication/connections 150a and 150b may transmit/receive signals through various physical channels. To this end, at least a part of various configuration information configuring processes, various signal processing processes (e.g., channel encoding/decoding, modulation/demodulation, and resource mapping/demapping), and resource allocating processes, for transmitting/receiving radio signals, may be performed based on the various proposals of the present disclosure.

Figure 20:
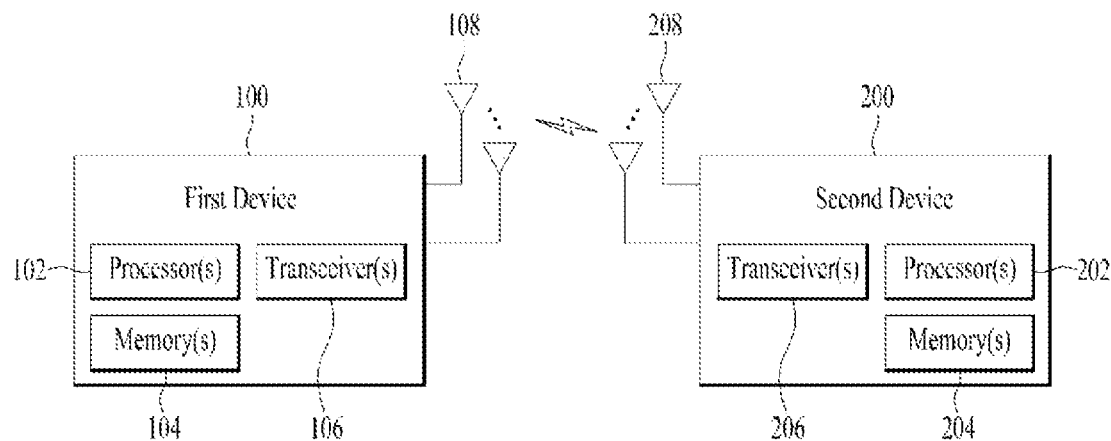

FIG. 20 illustrates wireless devices applicable to the present disclosure.

Referring to FIG. 20, a first wireless device 100 and a second wireless device 200 may transmit radio signals through a variety of RATs (e.g., LTE and NR). Herein, {the first wireless device 100 and the second wireless device 200} may correspond to {the wireless device 100x and the BS 200} and/or {the wireless device 100x and the wireless device 100x} of FIG. 19.

The first wireless device 100 may include one or more processors 102 and one or more memories 104 and additionally further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operational flowcharts disclosed in this document. For example, the processor(s) 102 may process information within the memory(s) 104 to generate first information/signals and then transmit radio signals including the first information/signals through the transceiver(s) 106. The processor(s) 102 may receive radio signals including second information/signals through the transceiver 106 and then store information obtained by processing the second information/signals in the memory(s) 104. The memory(s) 104 may be connected to the processor(s) 102 and may store a variety of information related to operations of the processor(s) 102. For example, the memory(s) 104 may store software code including commands for performing a part or the entirety of processes controlled by the processor(s) 102 or for performing the descriptions, functions, procedures, proposals, methods, and/or operational flowcharts disclosed in this document. Herein, the processor(s) 102 and the memory(s) 104 may be a part of a communication modem/circuit/chip designed to implement RAT (e.g., LTE or NR). The transceiver(s) 106 may be connected to the processor(s) 102 and transmit and/or receive radio signals through one or more antennas 108. Each of the transceiver(s) 106 may include a transmitter and/or a receiver. The transceiver(s) 106 may be interchangeably used with Radio Frequency (RF) unit(s). In an embodiment of the present disclosure, the wireless device may represent a communication modem/circuit/chip.

The second wireless device 200 may include one or more processors 202 and one or more memories 204 and additionally further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operational flowcharts disclosed in this document. For example, the processor(s) 202 may process information within the memory(s) 204 to generate third information/signals and then transmit radio signals including the third information/signals through the transceiver(s) 206. The processor(s) 202 may receive radio signals including fourth information/signals through the transceiver(s) 106 and then store information obtained by processing the fourth information/signals in the memory(s) 204. The memory(s) 204 may be connected to the processor(s) 202 and may store a variety of information related to operations of the processor(s) 202. For example, the memory(s) 204 may store software code including commands for performing a part or the entirety of processes controlled by the processor(s) 202 or for performing the descriptions, functions, procedures, proposals, methods, and/or operational flowcharts disclosed in this document. Herein, the processor(s) 202 and the memory(s) 204 may be a part of a communication modem/circuit/chip designed to implement RAT (e.g., LTE or NR). The transceiver(s) 206 may be connected to the processor(s) 202 and transmit and/or receive radio signals through one or more antennas 208. Each of the transceiver(s) 206 may include a transmitter and/or a receiver. The transceiver(s) 206 may be interchangeably used with RF unit(s). In an embodiment of the present disclosure, the wireless device may represent a communication modem/circuit/chip.

Hereinafter, hardware elements of the wireless devices 100 and 200 will be described more specifically. One or more protocol layers may be implemented by, without being limited to, one or more processors 102 and 202. For example, the one or more processors 102 and 202 may implement one or more layers (e.g., functional layers such as PHY, MAC, RLC, PDCP, RRC, and SDAP). The one or more processors 102 and 202 may generate one or more Protocol Data Units (PDUs) and/or one or more Service Data Unit (SDUs) according to the descriptions, functions, procedures, proposals, methods, and/or operational flowcharts disclosed in this document. The one or more processors 102 and 202 may generate messages, control information, data, or information according to the descriptions, functions, procedures, proposals, methods, and/or operational flowcharts disclosed in this document. The one or more processors 102 and 202 may generate signals (e.g., baseband signals) including PDUs, SDUs, messages, control information, data, or information according to the descriptions, functions, procedures, proposals, methods, and/or operational flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operational flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. As an example, one or more Application Specific Integrated Circuits (ASICs), one or more Digital Signal Processors (DSPs), one or more Digital Signal Processing Devices (DSPDs), one or more Programmable Logic Devices (PLDs), or one or more Field Programmable Gate Arrays (FPGAs) may be included in the one or more processors 102 and 202. The descriptions, functions, procedures, proposals, methods, and/or operational flowcharts disclosed in this document may be implemented using firmware or software and the firmware or software may be configured to include the modules, procedures, or functions. Firmware or software configured to perform the descriptions, functions, procedures, proposals, methods, and/or operational flowcharts disclosed in this document may be included in the one or more processors 102 and 202 or stored in the one or more memories 104 and 204 so as to be driven by the one or more processors 102 and 202. The descriptions, functions, procedures, proposals, methods, and/or operational flowcharts disclosed in this document may be implemented using firmware or software in the form of code, commands, and/or a set of commands The one or more memories 104 and 204 may be connected to the one or more processors 102 and 202 and store various types of data, signals, messages, information, programs, code, instructions, and/or commands. The one or more memories 104 and 204 may be configured by Read-Only Memories (ROMs), Random Access Memories (RAMs), Electrically Erasable Programmable Read-Only Memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or radio signals/channels, mentioned in the methods and/or operational flowcharts of this document, to one or more other devices. The one or more transceivers 106 and 206 may receive user data, control information, and/or radio signals/channels, mentioned in the descriptions, functions, procedures, proposals, methods, and/or operational flowcharts disclosed in this document, from one or more other devices. For example, the one or more transceivers 106 and 206 may be connected to the one or more processors 102 and 202 and transmit and receive radio signals. For example, the one or more processors 102 and 202 may perform control so that the one or more transceivers 106 and 206 may transmit user data, control information, or radio signals to one or more other devices. The one or more processors 102 and 202 may perform control so that the one or more transceivers 106 and 206 may receive user data, control information, or radio signals from one or more other devices. The one or more transceivers 106 and 206 may be connected to the one or more antennas 108 and 208 and the one or more transceivers 106 and 206 may be configured to transmit and receive user data, control information, and/or radio signals/channels, mentioned in the descriptions, functions, procedures, proposals, methods, and/or operational flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received radio signals/channels etc. from RF band signals into baseband signals in order to process received user data, control information, radio signals/channels, etc. using the one or more processors 102 and 202. The one or more transceivers 106 and 206 may convert the user data, control information, radio signals/channels, etc. processed using the one or more processors 102 and 202 from the base band signals into the RF band signals. To this end, the one or more transceivers 106 and 206 may include (analog) oscillators and/or filters.

Figure 21:
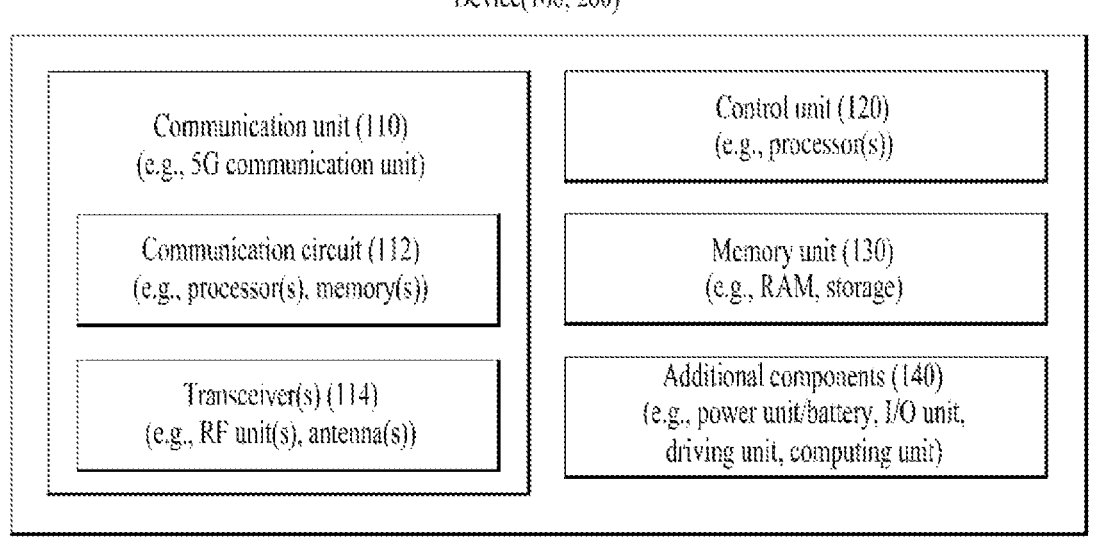

FIG. 21 illustrates another example of a wireless device applied to the present disclosure. The wireless device may be implemented in various forms according to a use-case/service (refer to FIG. 19).

Referring to FIG. 21, wireless devices 100 and 200 may correspond to the wireless devices 100 and 200 of FIG. 20 and may be configured by various elements, components, units/portions, and/or modules. For example, each of the wireless devices 100 and 200 may include a communication unit 110, a control unit 120, a memory unit 130, and additional components 140. The communication unit may include a communication circuit 112 and transceiver(s) 114. For example, the communication circuit 112 may include the one or more processors 102 and 202 and/or the one or more memories 104 and 204 of FIG. 20. For example, the transceiver(s) 114 may include the one or more transceivers 106 and 206 and/or the one or more antennas 108 and 208 of FIG. 20. The control unit 120 is electrically connected to the communication unit 110, the memory 130, and the additional components 140 and controls overall operation of the wireless devices. For example, the control unit 120 may control an electric/mechanical operation of the wireless device based on programs/code/commands/information stored in the memory unit 130. The control unit 120 may transmit the information stored in the memory unit 130 to the exterior (e.g., other communication devices) via the communication unit 110 through a wireless/wired interface or store, in the memory unit 130, information received through the wireless/wired interface from the exterior (e.g., other communication devices) via the communication unit 110.

The additional components 140 may be variously configured according to types of wireless devices. For example, the additional components 140 may include at least one of a power unit/battery, input/output (I/O) unit, a driving unit, and a computing unit. The wireless device may be implemented in the form of, without being limited to, the robot (100a of FIG. 19), the vehicles (100b-1 and 100b-2 of FIG. 19), the XR device (100c of FIG. 19), the hand-held device (100d of FIG. 19), the home appliance (100e of FIG. 19), the IoT device (100f of FIG. 19), a digital broadcast terminal, a hologram device, a public safety device, an MTC device, a medicine device, a fintech device (or a finance device), a security device, a climate/environment device, the AI server/device (400 of FIG. 19), the BS s (200 of FIG. 19), a network node, etc. The wireless device may be used in a mobile or fixed place according to a use-example/service.

In FIG. 21, the entirety of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module within the wireless devices 100 and 200 may further include one or more elements. For example, the control unit 120 may be configured by a set of one or more processors. As an example, the control unit 120 may be configured by a set of a communication control processor, an application processor, an Electronic Control Unit (ECU), a graphical processing unit, and a memory control processor. As another example, the memory 130 may be configured by a Random Access Memory (RAM), a Dynamic RAM (DRAM), a Read Only Memory (ROM)), a flash memory, a volatile memory, a non-volatile memory, and/or a combination thereof.

Figure 22:
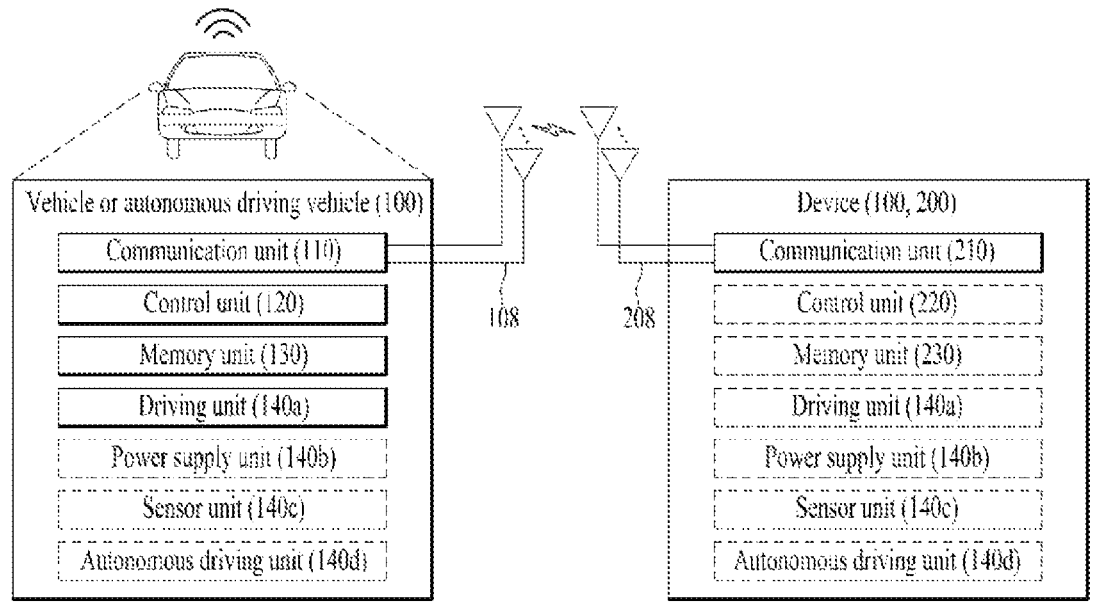

FIG. 22 illustrates a vehicle or an autonomous driving vehicle applied to the present disclosure. The vehicle or autonomous driving vehicle may be implemented by a mobile robot, a car, a train, a manned/unmanned Aerial Vehicle (AV), a ship, etc.

Referring to FIG. 22, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 21, respectively.

The communication unit 110 may transmit and receive signals (e.g., data and control signals) to and from external devices such as other vehicles, BS s (e.g., gNBs and road side units), and servers. The control unit 120 may perform various operations by controlling elements of the vehicle or the autonomous driving vehicle 100. The control unit 120 may include an Electronic Control Unit (ECU). The driving unit 140a may cause the vehicle or the autonomous driving vehicle 100 to drive on a road. The driving unit 140a may include an engine, a motor, a powertrain, a wheel, a brake, a steering device, etc. The power supply unit 140b may supply power to the vehicle or the autonomous driving vehicle 100 and include a wired/wireless charging circuit, a battery, etc. The sensor unit 140c may acquire a vehicle state, ambient environment information, user information, etc. The sensor unit 140c may include an Inertial Measurement Unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, etc. The autonomous driving unit 140d may implement technology for maintaining a lane on which a vehicle is driving, technology for automatically adjusting speed, such as adaptive cruise control, technology for autonomously driving along a determined path, technology for driving by automatically setting a path if a destination is set, and the like.

For example, the communication unit 110 may receive map data, traffic information data, etc. from an external server. The autonomous driving unit 140d may generate an autonomous driving path and a driving plan from the obtained data. The control unit 120 may control the driving unit 140a such that the vehicle or the autonomous driving vehicle 100 may move along the autonomous driving path according to the driving plan (e.g., speed/direction control). In the middle of autonomous driving, the communication unit 110 may aperiodically/periodically acquire recent traffic information data from the external server and acquire surrounding traffic information data from neighboring vehicles. In the middle of autonomous driving, the sensor unit 140c may obtain a vehicle state and/or surrounding environment information. The autonomous driving unit 140d may update the autonomous driving path and the driving plan based on the newly obtained data/information. The communication unit 110 may transfer information about a vehicle position, the autonomous driving path, and/or the driving plan to the external server. The external server may predict traffic information data using AI technology, etc., based on the information collected from vehicles or autonomous driving vehicles and provide the predicted traffic information data to the vehicles or the autonomous driving vehicles.

FIG. 23 is a diagram illustrating a DRX operation of a UE according to an embodiment of the present disclosure.

The UE may perform a DRX operation in the afore-described/proposed procedures and/or methods. A UE configured with DRX may reduce power consumption by receiving a DL signal discontinuously. DRX may be performed in an RRC_IDLE state, an RRC_INACTIVE state, and an RRC_CONNECTED state. The UE performs DRX to receive a paging signal discontinuously in the RRC_IDLE state and the RRC_INACTIVE state. DRX in the RRC_CONNECTED state (RRC_CONNECTED DRX) will be described below.

Referring to FIG. 23, a DRX cycle includes an On Duration and an Opportunity for DRX. The DRX cycle defines a time duration between periodic repetitions of the On Duration. The On Duration is a time period during which the UE monitors a PDCCH. When the UE is configured with DRX, the UE performs PDCCH monitoring during the On Duration. When the UE successfully detects a PDCCH during the PDCCH monitoring, the UE starts an inactivity timer and is kept awake. On the contrary, when the UE fails in detecting any PDCCH during the PDCCH monitoring, the UE transitions to a sleep state after the On Duration. Accordingly, when DRX is configured, PDCCH monitoring/reception may be performed discontinuously in the time domain in the afore-described/proposed procedures and/or methods. For example, when DRX is configured, PDCCH reception occasions (e.g., slots with PDCCH SSs) may be configured discontinuously according to a DRX configuration in an embodiment of the present disclosure. On the contrary, when DRX is not configured, PDCCH monitoring/ reception may be performed continuously in the time domain. For example, when DRX is not configured, PDCCH reception occasions (e.g., slots with PDCCH SS s) may be configured continuously in an embodiment of the present disclosure. Irrespective of whether DRX is configured, PDCCH monitoring may be restricted during a time period configured as a measurement gap.

Table 7 describes a DRX operation of a UE (in the RRC_CONNECTED state). Referring to Table 7, DRX configuration information is received by higher-layer signaling (e.g., RRC signaling), and DRX ON/OFF is controlled by a DRX command from the MAC layer. Once DRX is configured, the UE may perform PDCCH monitoring discontinuously in performing the afore-described/proposed procedures and/or methods.

TABLE 7

| | Type of signals | UE procedure |
| --- | --- | --- |
| 1st step | RRC signalling (MAC-CellGroupConfig) | Receive DRX configuration information |
| 2nd Step | MAC CE ((Long) DRX command MAC CE) | Receive DRX command |
| 3rd Step | — | Monitor a PDCCH during an on-duration of a DRX cycle |

MAC-CellGroupConfig includes configuration information required to configure MAC parameters for a cell group. MAC-CellGroupConfig may also include DRX configuration information. For example, MAC-CellGroupConfig may include the following information in defining DRX.

Value of drx-OnDurationTimer: defines the duration of the starting period of the DRX cycle.

Value of drx-InactivityTimer: defines the duration of a time period during which the UE is awake after a PDCCH occasion in which a PDCCH indicating initial UL or DL data has been detected Value of drx-HARQ-RTT-TimerDL: defines the duration of a maximum time period until a DL retransmission is received after reception of a DL initial transmission.

Value of drx-HARQ-RTT-TimerDL: defines the duration of a maximum time period until a grant for a UL retransmission is received after reception of a grant for a UL initial transmission.

drx-LongCycleStartOffset: defines the duration and starting time of a DRX cycle.

drx-ShortCycle (optional): defines the duration of a short DRX cycle.

When any of drx-OnDurationTimer, drx-InactivityTimer, drx-HARQ-RTT-TimerDL, and drx-HARQ-RTT-TimerDL is running, the UE performs PDCCH monitoring in each PDCCH occasion, staying in the awake state.

The above-described embodiments correspond to combinations of elements and features of the present disclosure in prescribed forms. And, the respective elements or features may be considered as selective unless they are explicitly mentioned. Each of the elements or features can be implemented in a form failing to be combined with other elements or features. Moreover, it is able to implement an embodiment of the present disclosure by combining elements and/or features together in part. A sequence of operations explained for each embodiment of the present disclosure can be modified. Some configurations or features of one embodiment can be included in another embodiment or can be substituted for corresponding configurations or features of another embodiment. And, an embodiment may be configured by combining claims failing to have relation of explicit citation in the appended claims together or can be included as new claims by amendment after filing an application.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

INDUSTRIAL APPLICABILITY

The present disclosure is applicable to UEs, BSs, or other apparatuses in a wireless mobile communication system.

The invention claimed is:

1. A method of receiving a signal by a user equipment (UE) in a wireless communication system, the method comprising:
   monitoring a paging early indication (PEI);
   monitoring a physical downlink control channel (PDCCH) on a paging occasion (PO) related to the PEI based on detection of the PEI; and
   receiving a physical downlink shared channel (PDSCH) based on downlink control information (DCI) carried by the PDCCH,
   wherein a slot in which the PDSCH is to be received is determined based on one of a plurality of time domain resource allocation (TDRA) tables configured in the UE and a value 'N' of a TDRA field included in the DCI;
   wherein the plurality of TDRA tables include a first TDRA table including at least one entry for same-slot scheduling of the PDCCH and the PDSCH and a second TDRA table including only entries for cross slot scheduling of the PDCCH and the PDSCH; and
   wherein whether the value 'N' of the TDRA field indicates an entry 'N' of the first TDRA table or an entry 'N' of the second TDRA table is determined based on the PEI.

2. The method of claim 1, wherein the UE determines one TDRA table related to the value 'N' of the TDRA field among the plurality of TDRA tables based on whether the PEI is related to a first radio network temporary identifier (RNTI) or a second RNTI.

3. The method of claim 2, wherein the first RNTI is configured irrespective of UE capability for detecting the PEI, and wherein the second RNTI is configured based on that the UE has the UE capability for detecting the PEI.

4. The method of claim 2,
   wherein the UE determines that the value 'N' of the TDRA field indicates the entry 'N' of the first TDRA table based on that the first RNTI is used in cyclic redundancy check (CRC) scrambling, or
   wherein the UE determines that the value 'N' of the TDRA field indicates the entry 'N' of the second TDRA table based on that the second RNTI is used in the CRC scrambling.

5. The method of claim 4, wherein the CRC scrambling includes at least one of CRC scrambling of the PEI and CRC scrambling of the PDCCH.

6. The method of claim 1, wherein, before decoding of the DCI carried by the PDCCH is completed, the UE determines, based on the detection of the PEI, whether the PDSCH scheduled by the DCI is to be scheduled only after a slot in which the DCI is received.

7. The method of claim 1, wherein the UE assumes that the PDSCH is not scheduled on the same slot as the PDCCH in a state in which the second TDRA is selected based on the PEI.

8. The method of claim 1, wherein at least one of the PDCCH and the PDSCH is scrambled based on a radio network temporary identifier (RNTI) indicated through the PEI.

9. The method of claim 1, wherein each entry of each TDRA table indicates a combination of {slot offset, start symbol, and length} for a corresponding PDSCH time resource.

10. A non-transitory medium readable by a processor and storing instructions, when executed by the processor, that cause the processor to perform the method of claim 1.

11. A device for wireless communication, the device comprising:
- a memory configured to store instructions; and
- a processor configured to perform operations by executing the instructions,
- wherein the operations of the processor include:
- monitoring a paging early indication (PEI);
- monitoring a physical downlink control channel (PDCCH) on a paging occasion (PO) related to the PEI based on detection of the PEI; and
- receiving a physical downlink shared channel (PDSCH) based on downlink control information (DCI) carried by the PDCCH;
- wherein a slot in which the PDSCH is to be received is determined based on one of a plurality of time domain resource allocation (TDRA) tables configured in the device and a value 'N' of a TDRA field included in the DCI;
- wherein the plurality of TDRA tables include a first TDRA table including at least one entry for same-slot scheduling of the PDCCH and the PDSCH and a second TDRA table including only entries for cross slot scheduling of the PDCCH and the PDSCH; and
- wherein whether the value 'N' of the TDRA field indicates an entry 'N' of the first TDRA table or an entry 'N' of the second TDRA table is determined based on the PEI.

12. The device of claim 11, wherein the device is an application specific integrated circuit (ASIC) or a digital signal processing device.

13. The device of claim 11, wherein the device is a user equipment (UE) operating in a 3rd generation partnership project (3GPP)-based wireless communication system.

14. A method of transmitting a signal by a base station (BS) in a wireless communication system, the method comprising:
- transmitting a paging early indication (PEI);
- transmitting a physical downlink control channel (PDCCH) on a paging occasion (PO) related to the PEI after the transmitting the PEI; and
- transmitting a physical downlink shared channel (PDSCH) based on downlink control information (DCI) carried by the PDCCH,
- wherein a slot in which the PDSCH is to be transmitted is indicated based on one of a plurality of time domain resource allocation (TDRA) tables and a value 'N' of a TDRA field included in the DCI;
- wherein the plurality of TDRA tables include a first TDRA table including at least one entry for same-slot scheduling of the PDCCH and the PDSCH and a second TDRA table including only entries for cross slot scheduling of the PDCCH and the PDSCH; and
- wherein whether the value 'N' of the TDRA field indicates an entry 'N' of the first TDRA table or an entry 'N' of the second TDRA table is determined based on the PEI.

* * * * *